United States Patent [19]

Tymes

[11] Patent Number: 5,029,183
[45] Date of Patent: Jul. 2, 1991

[54] PACKET DATA COMMUNICATION NETWORK

[75] Inventor: LaRoy Tymes, Palo Alto, Calif.

[73] Assignee: Symbol Technologies, Inc., Bohemia, N.Y.

[21] Appl. No.: 374,452

[22] Filed: Jun. 29, 1989

[51] Int. Cl.[5] .......................................... H04B 15/00
[52] U.S. Cl. ...................................................... 375/1
[58] Field of Search ........................................... 375/1

[56] References Cited

U.S. PATENT DOCUMENTS

| | | | |
|---|---|---|---|
| 3,641,433 | 2/1972 | Mifflin et al. | 375/1 |
| 4,247,908 | 1/1981 | Lockart et al. | 364/900 |
| 4,291,409 | 9/1981 | Weinberg et al. | 375/1 |
| 4,409,470 | 10/1983 | Shepard et al. | 235/472 |
| 4,460,120 | 7/1984 | Shepard et al. | 235/472 |
| 4,475,208 | 10/1984 | Ricketts | 375/1 |
| 4,639,914 | 1/1987 | Winters | 370/110.1 |
| 4,672,658 | 6/1987 | Kavehrad et al. | 379/63 |
| 4,673,805 | 6/1987 | Shepard et al. | 235/472 |
| 4,736,095 | 4/1988 | Shepard et al. | 235/472 |
| 4,740,792 | 4/1988 | Sagey et al. | 342/457 |
| 4,758,717 | 7/1988 | Shepard et al. | 235/472 |
| 4,789,983 | 12/1988 | Acampora et al. | 370/96 |
| 4,829,540 | 5/1989 | Waggener, Sr. et al. | 375/1 |
| 4,850,009 | 7/1989 | Zook et al. | 379/96 |

OTHER PUBLICATIONS

MSI Data Corporation, Product Brochure, MSI PRT Portable Radio Terminal, 2 pages, 1988.
Vectran Corporation, Product Brochures, VR1100, VR1120, VR1130 and VR1150 Systems for Radio Data Link.
Freret et al., "Applications of Spread-Spectrum Radio to Wireless Terminal Communications", Conf. Record, Nat'l Telecom. Conf., Nov. 30-Dec. 4, '80.

Primary Examiner—Thomas H. Tarcza
Assistant Examiner—David Cain
Attorney, Agent, or Firm—Arnold, White & Durkee

[57] ABSTRACT

A packet data transmission system is used to link a number of remote hand-held data-gathering units such as bar code readers to a central computer which maintains a database management system. Data packets are sent from the remote units by an RF link to intermediate base stations, then sent by the base stations to the central computer by a serial link. Direct sequence spread spectrum modulation is used for the RF link. The remote hand-held units initiate an exhange using RF transmission to and from the base stations, receiving only during a rigid time window following a transmission from the remote unit. The base stations cannot initiate communication to the remote units, but instead send data to the remote units only as part of the exchange.

84 Claims, 6 Drawing Sheets

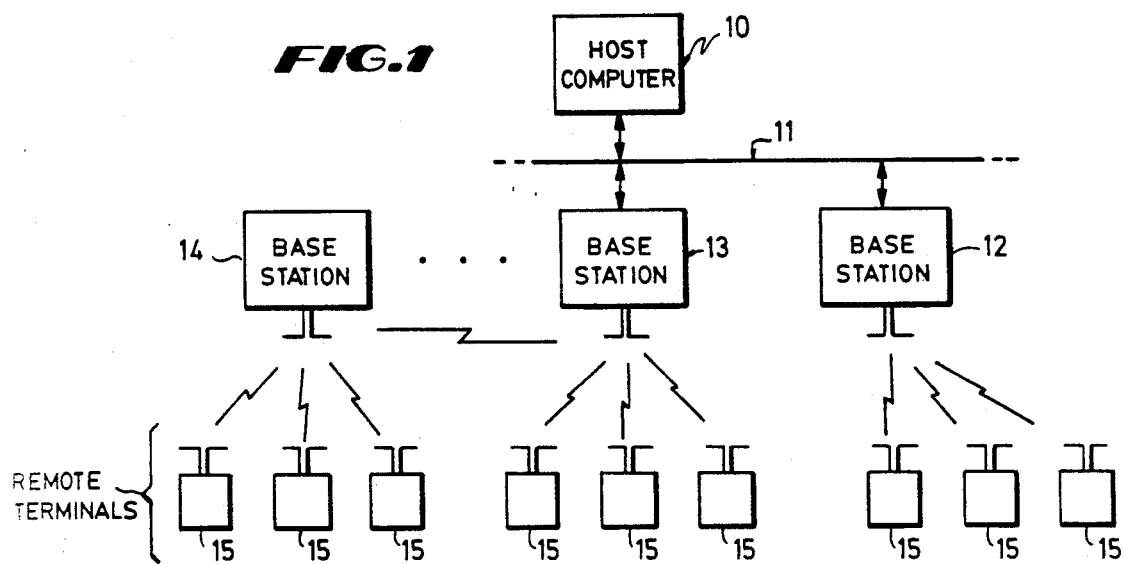
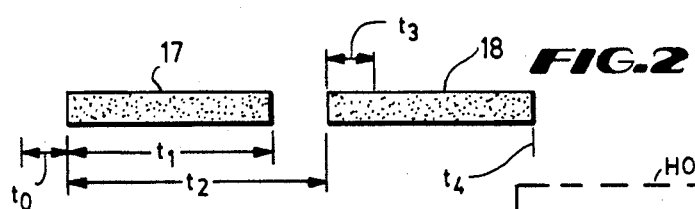
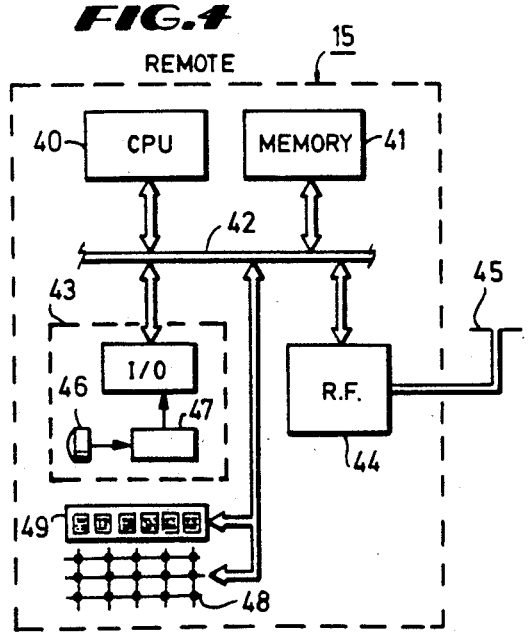
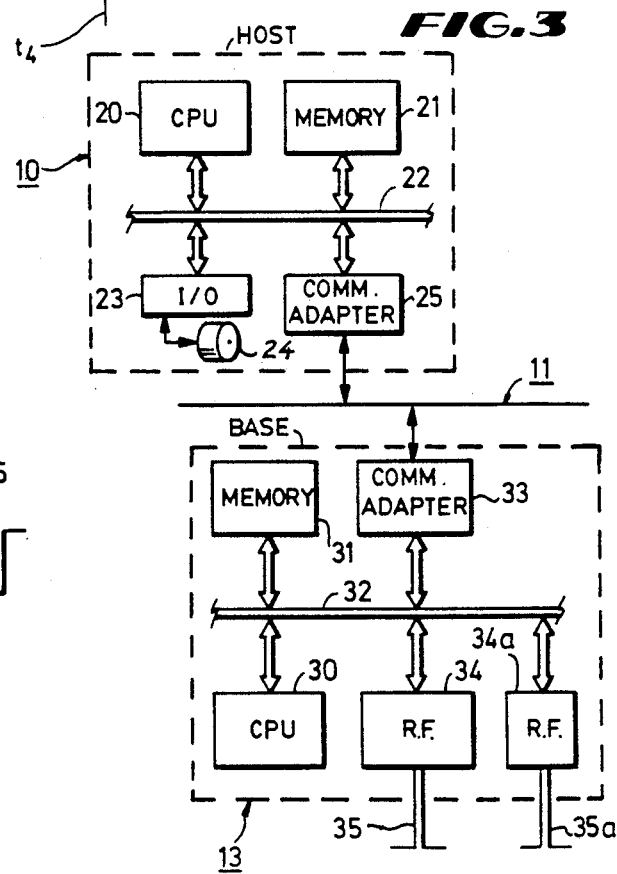

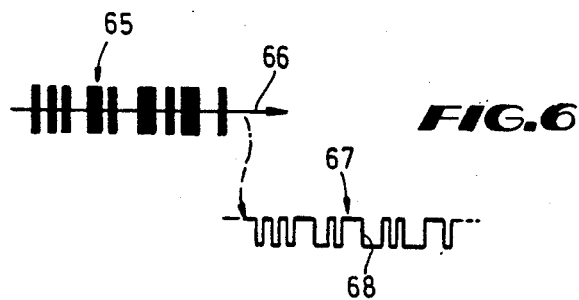
FIG.6
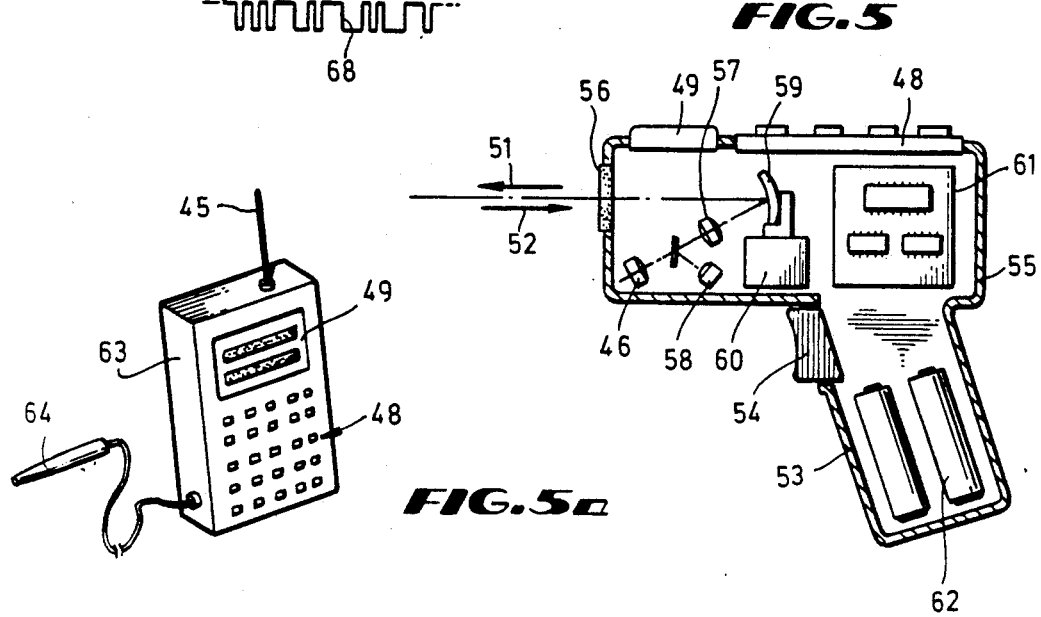
FIG.5
FIG.5a
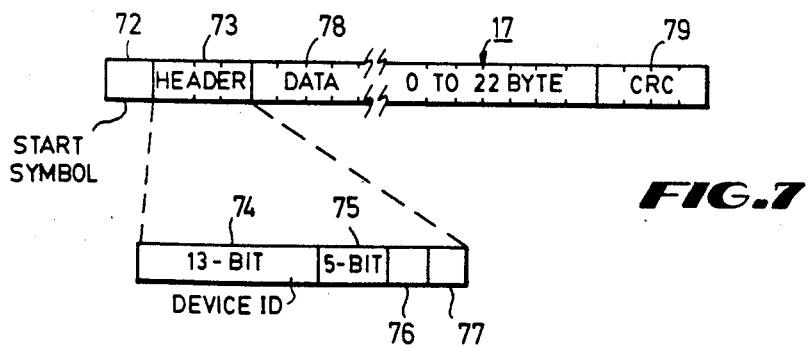
FIG.7
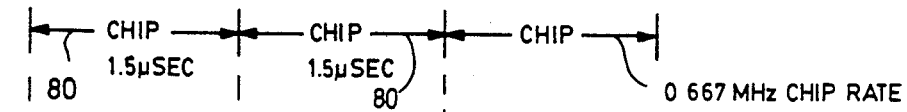
FIG.8a
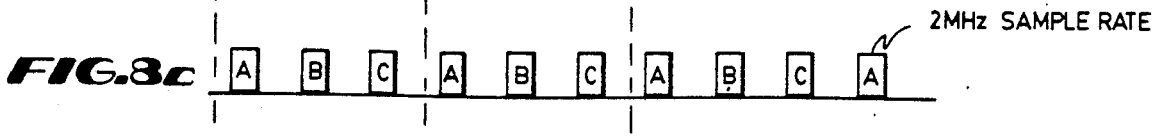
FIG.8b
FIG.8c

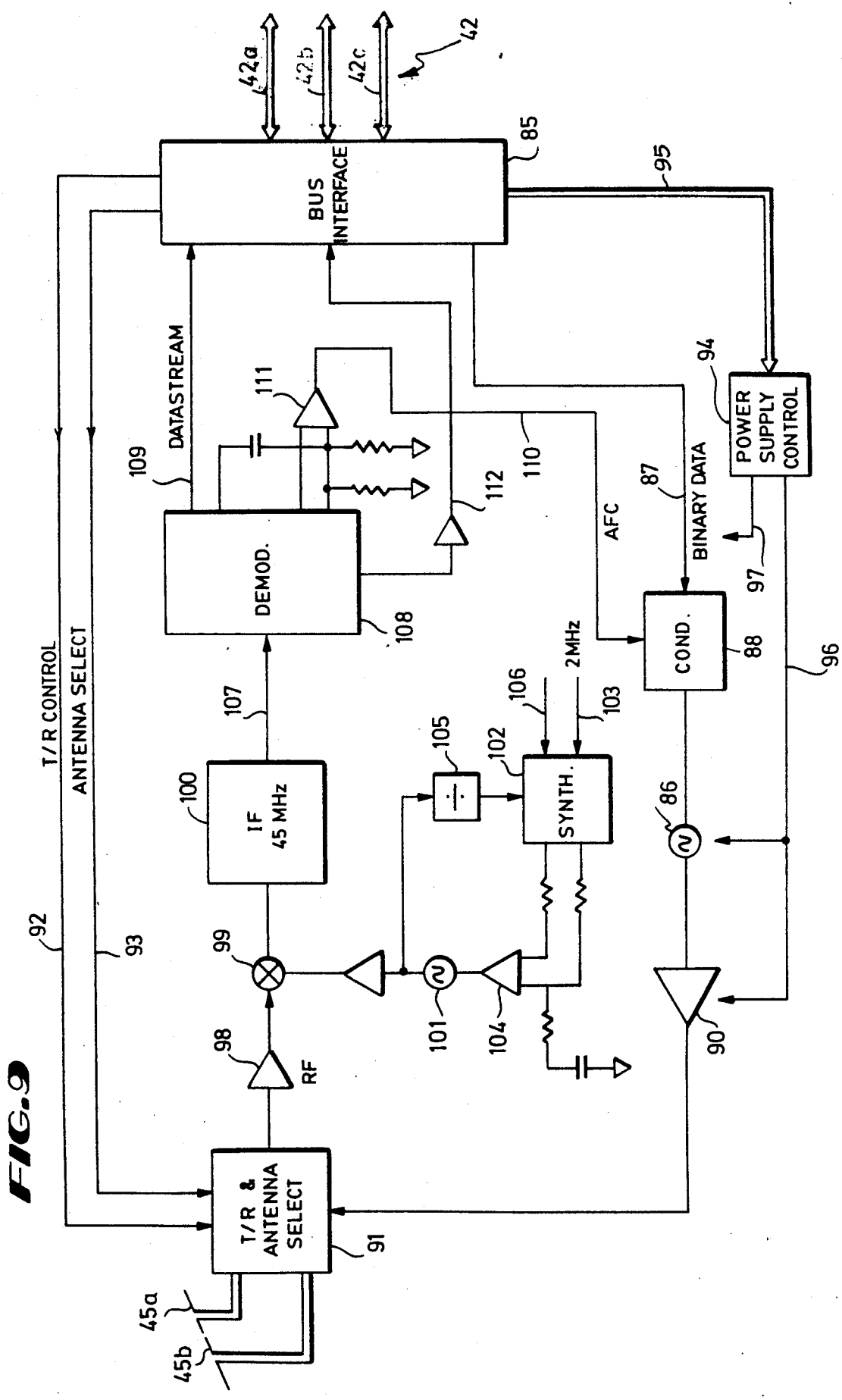

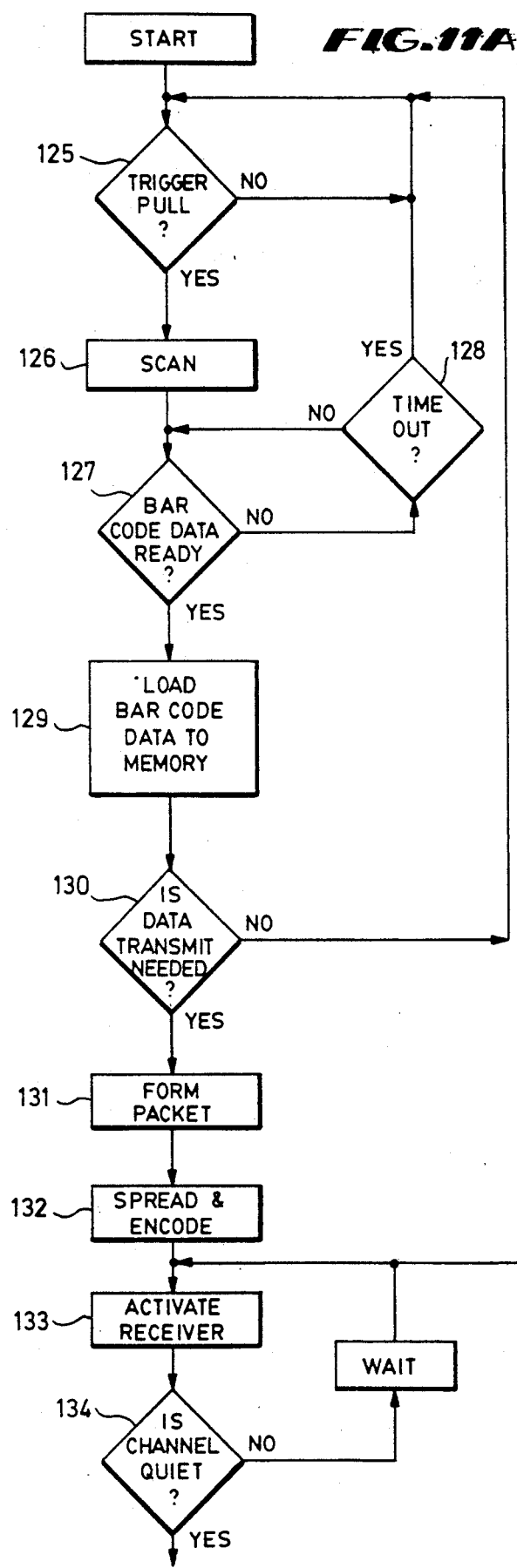
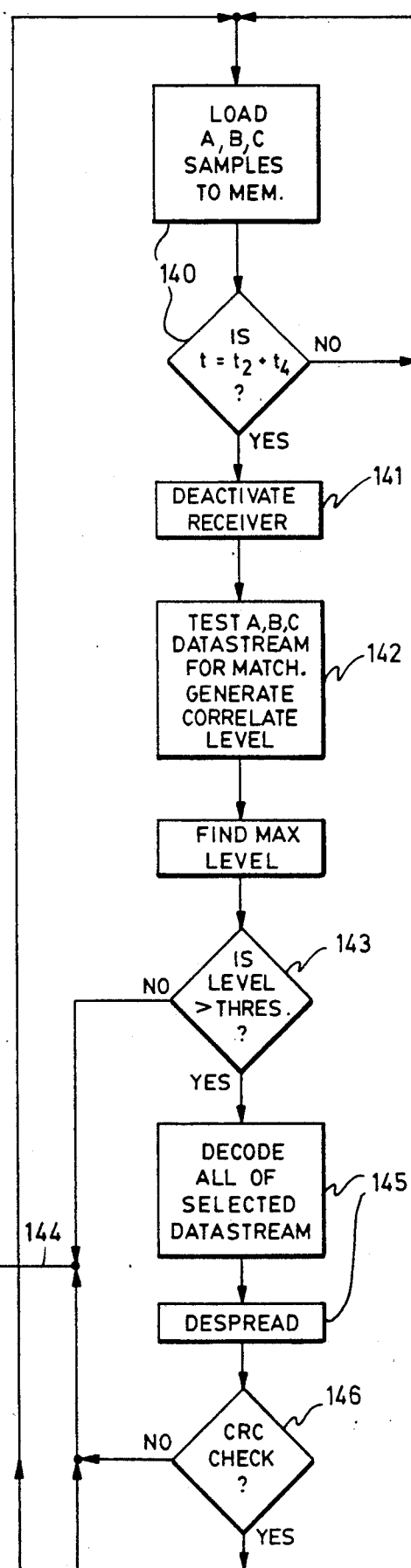
FIG. 11A

PACKET DATA COMMUNICATION NETWORK

BACKGROUND OF THE INVENTION

This invention relates to data communication systems, and more particularly to an RF packet communication system in which a number of remote units send data to a central computer via intermediate base stations.

Bar code readers used in retail or commercial facilities are usually connected to a central computer by physical wiring. This connection is quite suitable for permanently-mounted bar code readers as used in supermarket checkout counters, or for hand-held scanners or wands used at similar fixed locations. However, when the bar code reader is to be used by a person who is moving about a building, or when temporary installations are employed, physical wiring is unsuitable, or is at least quite inconvenient. A radio frequency (RF) link can be used to send data from the a hand-held bar code scanner to a central station, or to a local relay point, but the RF links that have previously been available for this purpose have had characteristics making them expensive and inconvenient. These RF links typically have used RF bands requiring F.C.C. licensing for each installation, adding to the cost and administrative burden. The RF components employed in this type of equipment have to be of high precision so that frequency drift and bandwidth spillage are kept within F.C.C. tolerances. In addition, battery drain has required either large, heavy batteries, or frequent recharging, or both. The RF transmission methods previously used also have limited the number of portable terminals which could be used in a given area due to use of a relatively narrow bandwidth. Examples of bar code readers using local RF data links include portable terminals commerically available from the following companies: MSI Data Corporation, Vectran Corporation, LXE Corporation, Norand Corporation, and Telxon Corporation. Portable bar code readers having long-distance RF links are available from Mobil Data International and from Motorola, Inc. (the KDX1000).

Indoor RF communications networks of the voice type have been proposed, such as that of U.S. Pat. No. 4,789,983 for "Wireless Network for Wideband Indoor Communications", or U.S. Pat. No. 4,639,914 for "Wireless PBX/LAN System".

The remote terminals in these prior systems are addressable at any time, i.e., always activated, so the requirements for power are dictated by this feature. In addition, these prior systems have used RF frequency bands requiring F.C.C. licensing of individual users. For these reasons, prior systems of this type have been too costly and otherwise unsuitable for the present purposes.

Spread spectrum wireless transmission is able to use a band that is designated as an "unlicensed" band by the F.C.C. and so licensing is not a factor, and the use of spread spectrum techniques allows the transmission to be accomplished in a reliable manner even though this band is subject to interference from the many diverse users. In U.S. Pat. No. 4,672,658 for "Spread Spectrum Wireless PBX", a system is shown in which each separate user transceiver is matched with a separate transceiver at the central PBX, and each one of these matched pairs transmits with a unique direct sequence spread spectrum chipping pattern. A separate call set-up transceiver having a common direct sequence chipping pattern is used for exchanging information involved in setting up a call. As above, this system requires continuous monitoring of the RF bands by all of the transceivers, and is a voice oriented system requiring varying time periods of maintaining connections, as well as requiring connection from user to user, rather than user to central station. Another example of use of spread spectrum in a local RF link is a utility meter reading system wherein a utility truck driving by a house activates a reader by a CW transmission then receives the data from the reader.

Wireless data communications between a central computer and several remote terminals located within a building, using direct-sequence spread-spectrum techniques to overcome multipath interference, is described by Freret et al, NTC Record, Nov., 1980, but again these types of systems rely upon continuous operation of the portable units, and impose burdens on the RF circuitry in the remote units which result in complex and expensive construction.

In U.S. Pat. No. 4,740,792 a data transmission system using spread spectrum RF is illustrated wherein vehicles are provided with a transmitter, but no receiver, and the location of each vehicle is reported to a central station periodically by a transmitted packet. The transmitter is powered up only for a very limited duty cycle, so battery drain is minimized. This system has no ability to send data from a central station to one of the vehicles, or to allow the transmitter at the vehicle to receive an acknowledge signal indicating receipt of the data transmitted.

It is an object of the present invention to provide an improved, low-cost, low-power, data communication network in which a number of remote terminals units are able to send packets od data to a central station, and, in most cases, to receive acknowledge signals and data from the central station, preferably a network using an RF link or the like so that the remote units may move about freely in an area to be covered by the network. Another object is to provide an improved packet transmission network in which remote terminal units may be of low cost, low power and small size, yet provide reliable and fast response, as may be needed in a commercial facility (usually indoor) using bar code scanners or the like for data gathering. Another object is to provide an improved protocol for use in a packet data transmission network which results in reliable operation, low power consumption and low cost implementation. A particular object is to provide an RF data link for portable terminals usable without site licensing under F.C.C. regulations, so that the expense and delays incident to such licensing ar eliminated or minimized.

SUMMARY OF THE INVENTION

In accordance with one embodiment of the invention, a packet data communication system includes a number of remote terminal units for gathering data, and a communications link for sending packetized data to a central station and for receiving an acknowledge signal and data from the central station. A packet-exchange protocol is used for this communications link that provides reduced power dissipation at the remote unit by activating the receive function for only a short time, rather than requiring the remote unit to receive or "listen" at all times. To this end, the exchange protocol establishes a rigid time window keyed to a transmission by the remote unit, and the remote unit is responsive to a message form the central station only during this time window. The time window is defined to being at a fixed time delay after a transmission from the remote unit to the central station; at all other times, the receiver is not powered up. In this protocol, the central station cannot initiate a packet transmission to a remote unit, but instead must wait until the remote unit has sent a transmitted packet, then the central station can reply in the rigid time window, attaching to the acknowledge signal the data it wishes to send to this remote unit. The remote units are low-cost, hand-held units in one embodiment, and so will be of lesser computational capacity then the central station, and power dissipation must be minimized. Accordingly, use of this protocol permits the receive function, and the computation function needed to decode received data, to be scheduled or managed by the remote unit rather than being slaved to the central unit.

In an illustrative embodiment, the central station includes a number of base stations located indifferent rooms or areas, with all of the base stations connected to a central computer, either by a wire connection or by a similar RF link. At any given time, a remote unit is assigned to only one of these base stations, and as the remote unit moves about it is reassigned to another base station. A feature of the protocol is to include an ID number for the remote unit in the transmitted packet, and to include this same ID number in the reply packet, so acknowledgement by an assigned base station is confirmed. But there need be no address or ID of the base station included in the protocol for communicating with the remote units, since a remote unit is assigned to only one base station, and the base station merely serves as a conduit for communicating with the central computer in any event.

The remote terminal units are, in one embodiment, hand-held bar code readers, and these units are coupled to the central station by an RF link so that the user is free to move about the area of the network. Ususally the data packet being sent from the remote unit is the result of scanning a bar code symbol. The reply from the central station in this case would be a validation of the bar code information, or instructions to the user about what action to take regarding the package scanned by the hand-held unit.

In a preferred embodiment the RF link employs a spread spectrum modulation technique to send data packets from the remote terminals to the base stations and return. Spread spectrum methods utilize a transmitted bandwidth much wider than required for the data by adding some coded function to the data, then the received signal is decoded and remapped into the original information bandwidth. A particular advantage of this type of RF data link is that a band may be used which does not require site licensing by the F.C.C., yet it provides reliable, low cost communication from a light-weight, hand-held, battery-operated unit.

An important feature in one embodiment is the use of the decode of an initial sync portion of the packet in the direct-sequence spread spectrum transmission to produce a quality factor for use in determining which base station should handle which remote unit. The spread-spectrum transmission contains considerable redundancy (eah bit is spread to produce a number of bits), and so a received packet can be used even if in a noisy environment where all decoded bits (before despreading) are not valid. By recording the degree to which the incoming packets from a remote unit correlate with the pseudo-random code used to generate the spread-spectrum signals, and comparing this data with that received at other base stations, the best station can be selected while communications continue uninterrupted.

BRIEF DESCRIPTION OF THE DRAWINGS

The features believed charcteristic of the invention are set forth in the appended claims. The invention itself, however, as well as other features and advantages thereof, may best be understood by reference to the detailed description of a specific embodiment which follows, when read in conjunction with the accompanying drawings, wherein:

FIG. 1 is an electrical diagram in block form of a packet data communication system according to one embodiment of the invention;

FIG. 2 is timing diagram showing events (RF transmission) vs. time for a data transmission sequence in the system of FIG. 1;

FIG. 3 is a more detailed electrical schematic diagram in block form of the host computer and one of the base stations in the system of FIG. 1;

FIG. 4 is a moe detailed electrical schematic diagram in block form of one of the remote terminals in the system of FIG. 1;

FIG. 5 is a sectional view of a hand-held bar code scanner unit which may be used as the remote terminal according to one embodiment of the invention;

FIG. 5a is a pictorial view of another type of bar code reader which may be used as the remote terminal instead of the laser scanner of FIG. 5, according to another embodiment of the invention;

FIG. 6 is a view of a part of a bar code symbol to be read by the remote unit of FIGS. 4 and 5, or of FIG. 5a, and a timing diagram of the electrical signal produced thereby;

FIG. 7 is an expanded view of part of the timing diagram of FIG. 2;

FIGS. 8a-8c are timing diagrams showing events vs. time occurring in the system of FIGS. 1 and 3-6 using the protocol of FIGS. 2 and 7;

FIG. 9 is an electrical schematic diagram of the circuitry of the transmitter/receiver in the remote unit of FIG. 4;

FIGS. 5a and 11b are a logic flow chart of an algorithm which may be executed by the CPU in a remote terminal unit of FIGS. 1, 4 and 9 for a system according to one embodiment of a invention.

DETAILED DESCRIPTION OF A SPECIFIC EMBODIMENT

Figure 10:
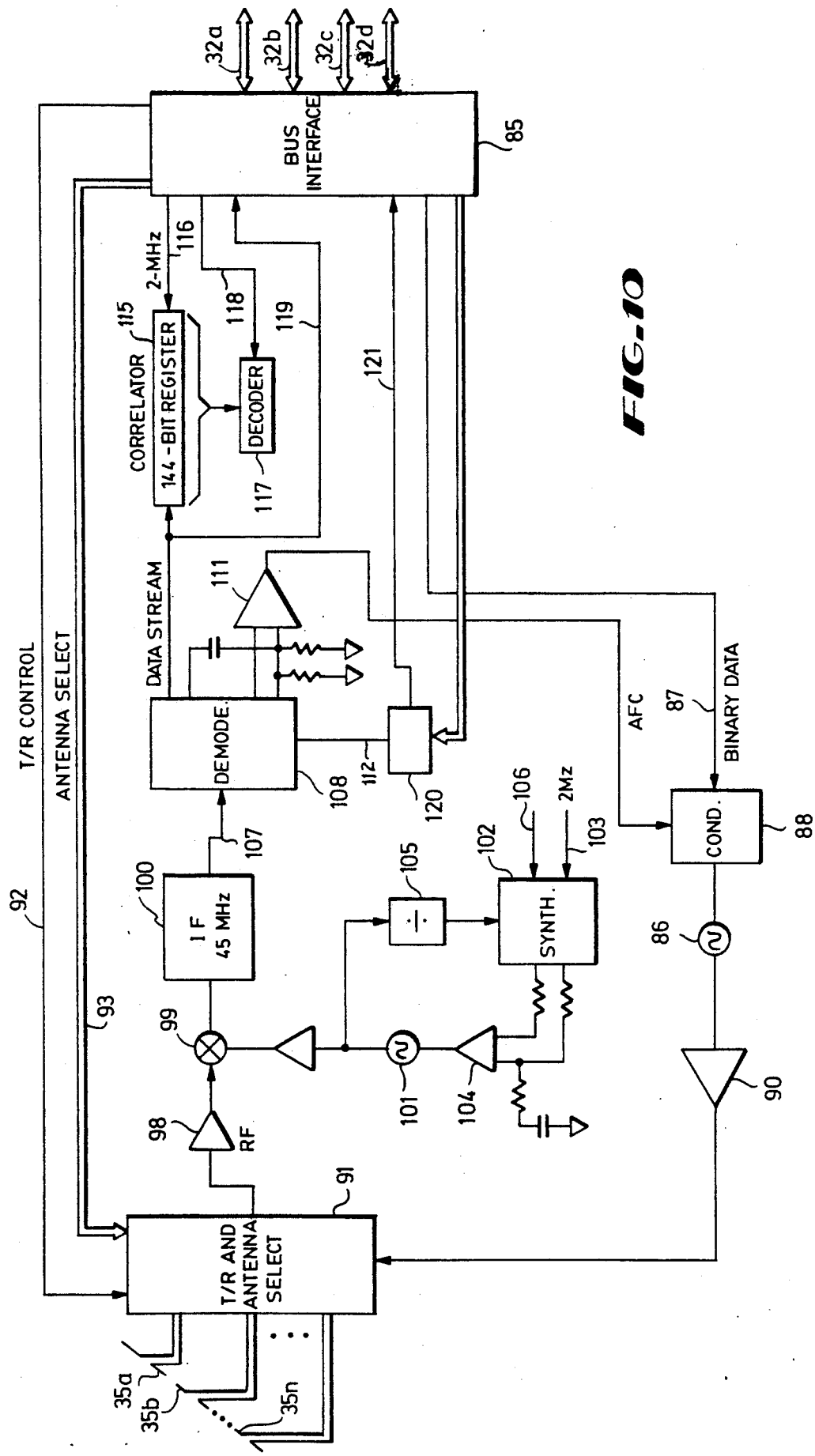
FIG. 10 is an electrical schematic diagram of the circuitry of the transmitter/receiver in a base station of the system of FIGS. 1 and 3.

Referring to FIG. 1, a data communications network according to one embodiment of the invention is illustrated. A host processor 10 is connected by a communications link 11 to a number of base stations 12 and 13; other base stations 14 can be coupled to the host through the base stations 12 or 13 by an RF link. Each one of the base stations 12, 13 or 14 is coupled by an RF link to a number of remote units 15. In one embodiment, the remote units 15 are laser-scan bar-code readers of the hand-held, battery-operated type as disclosed in U.S. Pat. Nos. 4,387,297, 4,409,470 or 4,760,248, all assigned to Symbol Technologies, Inc., for example. Various other types of remote terminals may be advantageously employed in a system having features of the invention; these remote terminals ordinarily would include data entry facilities such as a keyboard or the like, as well as a display (or printer) for indicating to a user information detected, transmitted and/or received by this terminal 15. In this embodiment used as an illustrative example, there may be from one up to sixty-four of the base stations 12, 13 and 14 (three being shown in the Figure), and up to several hundred of the remote units 15; of course, the network may be expanded by merely changing the size of address fields and the like in the digital system, as will appear, but a limiting factor is the RF traffic and attendant delays in waiting for a quiet channel. This communications network as seen in FIG. 1 would ordinarily be used in a manufacturing facility, office building complex, warehouse, retail establishment, or like commercial facility, or combination of these facilities, where the bar code readers or similar data-gathering terminals 15 would be used for inventory control in stockroom or receiving/shipping facilities, at checkout (point of sale) counters, for reading forms or invoices or the like, for personnel security checking at gates or other checkpoints, at time clocks, for manufacturing or process flow control, and many other such uses. Although hand-held, laser-scan type bar-code readers are mentioned, the data terminals 15 may also be bar-code readers of the wand type, and may be stationary rather than hand-held. The device may be of the optical character recognition (OCR) type, as well. Other types of data gathering devices may use the features of the invention, such as temperature or pressure measuring devices, event counters, voice or sound activated devices, intrusion detectors, etc.

According to an important feature of one embodiment of the invention, an RF packet communications protocol between the remote units 15 and the base stations 12, 13 and 14 includes a transmit/receive exhange, referred to hereinafter simply as an "exchange". This protocol is similar to collision-sense multiple-access (CSMA) in that a unit first listens before transmitting, and does not transmit if the channel is not free. As seen in FIG. 2, this exchange always begins with a remote-to-base transmitted packet 17, representing an RF transmission from a remote unit 15 to be received by the base stations within range. The transmitted packet 17 is followed after a fixed time interval by a base-to-remote transmitted packet 18, representing reception by the remote unit 15 of RF information transmitted by the base station servicing this particular remote unit 15. Each of these packets 17 and 18 is of fixed timing; a transceiver in a remote unit 15 beings an exchange at its own initiative by first listening for other traffic for a brief interval $t_0$ (typically 0.3 msec), and, if the RF channel is quiet, starting a transmission at a time of its own selection (asynchronous to any clock period of the base stations or host computer). This outgoing transmission packet 17 lasts for a time $t_1$ as seen in the Figure, and in an example embodiment this period is 4.8 milliseconds. Then at a precise time delay $t_2$ after it started transmission (e.g., 5-msec after the beginning of $t_1$) the transceiver begins listening for the return packet 18 from the base station. The transceiver in the remote unit 15 only responds to receipt of the packet beginning in a very rigid time window $t_3$ of a few microseconds length, and if the packet 18 has not started during this window then anything to follow is ignored. The packet 18 is an acknowledge signal, and also contains data if the base station has any message waiting to be sent. The packet 18 also is 4.8 millisecond in length, regardless of what data is included, if any, so a remote-to-base exhange, including acknoledge, takes about 9.8 msec in the example. The base stations 12, 13 and 14 cannot initiate an exchange of FIG. 2, or initiate any other such transmission to the remote units 15, but instead must wait until a packet 17 is received from the remote unit 15 for which this base station has a message waiting, then the data to be sent is included in the data portion of the return packet 18. For this reason, the remote units 15 are generally programmed to periodically, e.g., about every 500 msec or more, send a packet 17 to the base station with no data except its identifying code (traditionally called a NOP), so that the base station can send any data it has waiting in its memory for relay to this remote unit 15. To prevent another remote unit 15 from starting one of the exchanges of FIG. 2 in the interval just after the transmit packet 17 but before the receive packet 18 has started, time $t_0$, the listening time, is generally chosen to be longer than the time interval between transmit packet 17 and receive packet 18 (0.2 msec in this example). If another remote unit 15 tries to initiate its own exchange it will receive the RF transmission and will back off and try again at least about 10-msec later. In the manner of CSMA protocols, the remote units 15 can be programmed to wait random time delays before retry, to thereby lessen the likelihood of simultaneous retries.

Referring to FIG. 3, in a typical commercial or retail application of a network of FIG. 1, the host processor 10 maintains a database management system (employing suitable database management software similar to that commercially available) to which the remote units 15 make intries or inquiries via the base stations 12, 13 and 14. The host processor 10 has a CPU 20 which may be a microprocessor device of the 80386 type manufactured by Intel, for example, and the CPU accesses a memory 21 via a main bus 22 to execute instructions. Various I/O processors 23 are used to access peripherals such as keyboard, video display, etc., as well as disk storage 24 for the database system and other computer functions. A communications adapter 25 comples the CPU 20 via main bus 22 to the link 11. This communications link 11 may be of the serial type such as RS232, or in a system designed for higher performance the link 11 may use one of the available local area network type of protocols such as Ethernet or token ring; in the example embodiment, however, the standard local area network protocols are needlessly complex and expensive, and a more optimum solution is merely use of a serial port connected to a shared serial line 11, on a time-sharing basis (e.g., time slotted). The data rate on the link 11 is rather modest compared to typical 4-Mbit or 16-Mbit/sec LAN links of the token ring or Ethernet type; about 160-Kbit/sec is adequate for the link 11, and so one of the various time-slot type of serial link methods may be used.

The base stations 12, 13 and 14 each utilize a CPU 30 which accesses a memory 31 via local bus 32, also seen in FIG. 3. This data processing unit is coupled to the serial link 11 via a communications adapter 33. An RF transceiver 34 is coupled to the CPU 30 in each base station via the local bus 32 and is connected to an antenna 35 for RF transmission to and reception from the remote units 15 using the protocol of FIG. 2. An additional RF transceiver 34a may be used, as well, as an RF link to and from other base stations, if necessary. An example of a commercially-available microprocessor device which may be used as the CPU 30 is a V-25 device manufactured by NEC, which is the same device used in the remote units 15, as described below. Another microprocessor device which may be used as the CPU 30 is the DSP56001 manufactured by Motorola, Inc. of Phoenix, Ariz. This DSP56001 microprocessor is primarily sold as a digital signal processor but also functions as a high-performance, low-cost controller device, capable of executing a 24-bit by 24-bit multiply operation in 100-nsec, and implementing interrupt routines in 200-nsec. Examples of code used to execute typical I/O algorithms and code recognition are available from the manufacturer of th microprocessor devices or associated vendors. The memory 31 includes ROM or EPROM for startup code executed by the CPU 30, as well as fast RAM for the program executed during normal operations and for buffering the digital data incoming from or outgoing to the RF transceiver 34. In addition, the CPU 30 includes a number of fast internal registers used for data manipulation in executing the code recognition algorithms. A particularly useful feature of the 56001 device is that a serial port is available for transmitting and receiving data via the serial communications link 11, so this function can be implemented with little added circuitry in the adapter 33. Likewise, the V-25 device has an analog input which may be used for this purpose; similarly, the adapter 33 may buffer the incoming or outgoing serial data so that parallel transfers on the bus 32 are used for link data.

The base stations 12, 13 and 14 are ordinarily located in various rooms or bays of the commercial establishment containing the network of FIG. 1, or located in other such places not readily accessible to an operator, so usually a console with keyboard and display is not used; if,however, a base station is configured for desktop or wall mounting in an accessible location there may be I/O devices coupled to the bus 32 to allow local data entry or display. The base stations are usually powered by line current rather than being battery operated, and so there is less concern for power dissipation in these devices compared to that for the remote terminals 15. The RF signal path in this environment is changeable in nature as equipment, fork-lift trucks, furniture, doors, etc., are moved about, or as the user moves from place to place and carries the hand-held remote unit with him, or as the network is expanded or reduced in size; there is a high degree of multipathing in this type of RF link. Thus, the particular one of th base stations communicating at a given time with one of the remote units 15 may change; to this end a "hand-off" protocol may be utilized, as will be described, to change the base station which is designated to handle a remote unit. In this manner, a remote unit 15 has a confirmed virtual RF link with only one base station at a time, although others may be in range. The base station 12, 13 or 14 is merely an intermediary; the remote unit is communicating with the host processor 10, and the function of a base station is merely to relay the data from a remote unit to the host computer, or from the host computer to a remote unit. In a minimum-scale installation, there may be only one base station, in which case the communication link 11 may be a direct connection via an RS 232 serial port and calbe, or, if the building is such that the base station can be mounted at the same location as the host computer, the link 11 may be replaced by a parallel bus-to-bus interface, in which case the base station and host computer may be considered a single unit. When there are multiple base stations, the communications link 11 uses a protocol of adequate performance to allow each RF transmission (packet 17) from a remote unit 15 to be decoded in the base station and relayed to the host processor 10 via the link 11, then a reply sent back from the host computer 10 via the link 11 to the base station, so the base station can wait for another exchange for relay of the stored message to the remote unit 15 in a packet 18. This sequence should appear to a user (a person carrying the bar code reader) as essentially "real time", even though the actual delay may be hundreds of milliseconds. This short cycle is maintained even when the network includes a large number of the remote units 15 operating sporadically. Because of the RF protocol used, and the requirement that the RF link may be shared with a large number of remote units, the serial link 11 is much faster than an RF link via RF transceivers 34a and antennas 35 a from one base station to another base station, and so the serial link 11 is used for messages between base stations whenever possible. The RF link is the example embodiment using the protocol as described has a data rate of less than one-tenth that of the serial link 11. Only when the physical layout, or the temporary nature of the network, demands this solution is the RF link from base to base employed.

Referring to FIG. 4, each remote unit 15 in the example embodiment is a data terminal (e.g., a hand-held bar code reader) having a CPU 40 executing instructions from a program and data memory 41 which is coupled to the CPU via a local bus 42. a peripheral bar code data acquisition device 43 is coupled to the CPU via the bus 42 and used to detect and/or covnert data from the bar code scanning section to be stored in the memory 41 and processed by the CPU 40; other control devices interface with the keyboard and display. An RF transceiver 44 is coupled to and controlled by the CPU via the bus 42, and transmits the coded RF signal through an antenna 45 or detects and converts RF received by the antenna, according to a protocol. In the example of the remote unit 15 being a laser-scan bar-code reader, the device 43 is used to input data from a photodetector device 46 which produces a serial electrical signal fed to a code recognition circuit 47 responding to the characteristic patterns of bar code symbols and providing bar code data to the memory 41 via device 43 when a bar code is scanned. The bar code data is entered into the memory 41 by DMA if the CPU 40 includes this capability, or by move instructions executed by the CPU; alternatively, the memory 41 may be a video DRAM device allowing serial data entry by a serial port separated from that used for CPU access. The CPU 40 within the remote unit checks the bar code data for validity and format, by executing code stored in the memory 41, and, when the data packet has been pepared in the memory 41, the CPU initiates an RF transmission by activating the RF transceiver 44 and transferring the encoded packet containing the bar code data to the transceiver via bus 42. Usually the remote unit has a manual data entry device such as a keyboard 48, and a visual display 49 such as an LCD device; the elements of the keyboard and display are scanned by signals generated in the CPU 40, or generated in a keyboard and display I/O controller such as an Intel 8042 microcontroller widely used for this purpose, depending upon performance/cost considerations. An advantage of the protocol of FIG. 2, however, is that the CPU 40 can handle all of these tasks, including data input from the bar code scanner, keyboard and display scan, RF conrol, datastream transfers to and from the RF, and data encoding and decoding, beacuse the RF transmission and reception is under control of the remote unit rather than being scheduled by a higher level device such as the bases station or the host computer. That is, an important feature is the ability of the remote unit 15 to schedule events and communicate with the base station at times of its own choosing, as this ability simplifies the tasks of the remote unit. Therefore, the components needed in the remote unit of FIG. 4 are kept to a minimum for cost, size, weight and battry life considerations.

The CPU 40 in the remote unit 15 of FIG. 4 may be an Intel 8088 16-bit microprocessor device, having an external bus 42 which includes an 8-bit data bus, an address bus of up to 20-bit width (only about 14- to -15 bit addresses are needed in this example) and a set of control lines. Alternatively, the CPU 40 may be an NEC V-25 microprocessor, which is software compatible with the 8088 but has several added capabilities, such as a serial port, DMA capability, an analog input port, and multiple register sets to speed up context switches, as well as several added instructions. Of course, using a V-25 device for both the CPUs 30 and 40 simplifies the code-writing task since some of the code is used in both base and remote units. The memory 41 may consist of a 128-Kbit CPROM chip and a 128-Kbit static RAM chip, providing 32-Kbytes of memory which is sufficient for the tasks asssigned to this unit; of course, additional memory may be added for different tasks or higher performance. Preferably, CMOS devices are used for the CPU 40 and memory 41 (as well as in the RF circuitry 44 where possible) to minimize power disspation and battery drain. The 8088 or V-25 microprocessor devices are merely examples of the class of CPU device needed in te remote unit, it begin understood that other microprocessor devices may be used, although the 8088 device has the advantages of a low cost for the part and for the software; there is available a wide variety of software already in existence for the 8088 device.

Although other data terminal units 15 may be advantageously employed in a system having features of the invention, a hand-held, laser-scan, bar code reader unit as illustrated in FIG. 5 is an example of a remote unit particularly suited for use in the system of FIG. 1. This hand-held device of FIG. 5 is generally of the style disclosed in U.S. Pat. Nos. 4,760,248, 4,806,742 or 4,816,660 issued to Swartz et al, assigned to Symbol Technologies, Inc., and also similar to the configuration of a bar code reader commercially available as part number LS 8100II from Symbol Technologies, Inc. Alternatively, or in addition, features of U.S. Pat. No. 4,387,297 issued to Swartz et al, U.S. Pat. No. 4,409,470, issued to Shepard et al, U.S. Pat. No. 4,808,804, issued to Krichever and Metlitsky, or U.S. Pat. No. 4,816,661, issued to Krichever and Metlitsky, such patents assigned to Symbol Technologies, Inc, may be employed in constructing the bar code reader unit 15 of FIG. 3. These U.S. Pat. Nos. 4,816,661, 4,816,660, 4,808,804, 4,806,742, 4,760,248, 4,387,297, and 4,409,470 are incorporated herein by reference. A outgoing light beam 51 is generated in the reader 15, usually by a laser diode or the like, and directed to impinge upon a bar code symbol a few inches from the front of the reader unit. The outgoing beam 51 is scanned in a fixed linear pattern, and the user positions the hand-held unit so this scan pattern traverses the symbol to be read. Reflected light 52 from the symbol is detected by a light-responsive device 46 in the reader unit, producing serial electrical signals to be processed for identifying the bar code. The reader unit 15 is a gun-shaped device having a pistol-grip type of handle 53, and a movable trigger 54 is employed to allow the user to activate the light beam 51 and detector circuitry when pointed at the symbol to be read, thereby saving battery life if the unit is self-powered. A light-weight plastic housing 55 contains the laser light source, the detector 46, the optics and signal processing circuitry, and the CPU 40 and RF transceiver 44 of FIG. 2, as well as a battery. A light-transmissive window 56 in the front end of the housing 55 allows the outgoing light beam 51 to exit and the incoming reflected light 52 to enter. The reader 15 is designed to be aimed at a bar code symbol by the user from a position where the reader 15 is spaced from the symbol, i.e., not touching the symbol or moving across the symbol. Typically, this type of hand-held bar code reader is specified to operate in the range of perhaps several inches.

As seen in FIG. 5, a suitable lens 57 (or multiple lens system) is used to collimate and focus the scanned beam into the bar code symbol at the proper depth of field, and this same lens 57 may be used to focus the reflected light 52. A light source 58 such as a semiconductor laser diode is positioned to introduce a light beam into the axis of the lens 57 by a partially-silvered mirror and other lenses or beam-shaping structure as needed, along with an oscillating mirror 59 which is attached to a scanning motor 60 activated when the trigger 54 is pulled. If the light produced by the source 58 is not visible, an aiming light may be included in the optical system, again employing a partially-silvered mirror to introduce the beam into the light path coaxially with the lens 57. The aiming light, if needed, produces a visible-light spot which is scanned just like the laser beam; the user employs this visible light to aim the reader unit at the symbol before pulling the trigger 54. The electronic components of FIG. 4 are mounted on one or more small circuit boards 61 within the housing 55 of FIG. 5, an batteries 62 are enclosed to provide a self-contained portable unit. The antenna 45 may be printed on one of the circuit boards 61.

Referring to FIG. 5a, another embodiment of a remote terminal 15 is illustrated wherein a wand-type bar code reader is employed instead of the laser scanner of FIG. 5. This device of FIG. 5a is similar to a commercially-available portable radio terminal sold under the product name "MSI PRT" by MSI Data Corporation, of Costa Mesa, Calif., a subsidiary of Symbol Technologies, Inc, the assignee of this invention. The keyboard 48 and display 49 are mounted at the face of a hand-held housing 63, and the light source 58 (in this case an LED, for example) and light detector 46 (not seen in FIG. 5a) are mounted within a pencil-shaped wand 64 connected to the housing 63 by a cable. The person using the device of FIG. 5a holds the housing 63 in one hand and the wand 64 in the other, and moves the wand 64 across the bar code symbol, in contact with the symbol, instead of holding the unit steady (spaced from the symbol) and relying upon the oscillating mirror to generate the scan of the symbol as is the case for the FIG. 5 embodiment. Otherwise, the device of FIG. 5a contains the circuitry of FIG. 4, and the RF link operates in the same way.

Referring to FIG. 6, a part of a typical bar code symbol 65 is illustrated of the type read by the laser scanner of FIG. 5, or by the wand-type reader of FIG.

5a. In the case of a laser scanner, the laser scan beam 51 produces a scan line 66, and reflected laser light 52 detected by the photodetector 46 and shaped by the circuitry 47 produces a binary electrical signal 67 as also seen in FIG. 6. Or, in the case of a wand-type reader, the wand is moved along the line 66 and reflected light is detected to produce the same type of binary signal 67. Of interest are the transitions 68 in the signal 67 representing passage of the beam or light between light and dark areas or bars and spaces in the symbol 65 (dark produces a binary "0" and light a binary "1" in the illustration). A bar code symbol can be distinguished from other images by the spacing between transitions 68 as a function of time, or similar patterns of the signal. These distinguishing features can be checked by the code executed by the CPU 40 after the data is loaded to the memory 41. One data format used to load bar code data to the memory 41 is a sequence of numbers corresponding to the time between transitions 68. The bar code symbol 65 of FIG. 6 usually includes start and stop characters, and often a check sum is included in the encoded data, so the validity of the bar code symbol as read may be readily checked by the code executed by the CPU 40 when the data is in the memory 41.

In a typical operation, a user may be located in a receiving or stock room of a commercial or industrial establishment, where this user would aim the remote unit 15 of FIG. 5 at a bar code symbol 65 of FIG. 6 on a package of interest and pull the trigger 54. This trigger pull initiates a scan operation wherein the laser diode 58 is activated, the scanning motor 60 is energized to oscillate the mirror 59, the detector 46 is powered-up, and so bar code data is produced for entry to memory 41 via the data acquisition circuitry. Alternatively, of course, using a wand of FIG. 5a, the user would actuate the reader and move the wand 64 across the bar code symbol. In either case, this bar code data is loaded to memory 41 then the data may be processed to check for validity using routines executed by the CPU 40, and if valid then a data packet is defined in the memory 41 according to the protocol as will be described, then the RF transceiver 44 is activated by a command sent from the CPU 40, the encoded data packet is loaded to the transceiver 44 form the memory 41 in a sequence of bytes, and an RF transmission according to FIG. 2 is initiated, i.e., listen during $t_0$ then transmit a packet 17 if quiet. The base station 12, 13 or 14 receives the RF transmission packet 17 from the remote unit 15, decodes it on the fly, checks for errors, sends and RF acknowledge signal packet 18 to the remote unit 15 during the precise time window, and reformats the data in memory 31 by instructions executed by the CPU 30 for sending to the host computer 10 via communications link 11. The packet 17 from the remote unit 15, or the acknowledge packet 18 from the base station, may contain instructions about when the remote is to initiate another exchange to get the answer to its inquiry. After receiving the data relayed by the base station, the host computer 10 performs whatever database transaction is needed, then sends a response back to the base station via link 11, which the base station holds in memory 31 for sending to the remote unit 15 when another exchange occurs using the protocol of FIG. 2 and as described below. When the remote unit 15 has received the data sent by the host computer in response to its inquiry (relayed via one of the base stations), some indication may be displayed to the user by the LCD display 49 on the hand-held unit of FIG. 5, or of FIG. 5a. For example, the data sent from the host computer 10 may tell the user of the remote unit 15 to take some action with respect to the package which had the bar code symbol on it just read by the trigger pull, i.e., place the package in a certain bin, etc. For this type of operation, the response time from trigger pull to the answer appearing on the display 49 should be short enough as to be hardly noticeable, e.g., one second or less.

The type of operations as just described place several requirements upon the system. First, the remote units should be relatively light in weight and small in size, and of course should not require a wire connection to the central station. Battery operation is thus dictated, but the batteries should not have to be large or heavy, and frequent recharging is to be avoided. Line-of-sight communications, as by an infrared link, are inconvenient in this environment because of obstructions and restrictions in field of view, so RF is preferred. An RF link often imposes the burden of F.C.C. regulations, both for restrictions on the equipment and components employed and frequency bands used, but also for licensing of individual users or sites. The effects of these requirements are minimized as will be seen.

A more detailed view of the contents of transmitted packets 17 or 18 is seen in FIG. 7. The two packets 17 and 18 are the same in general format, so only one is shown. A packet 17 begins with a start signal 72 of fixed length which is used to give notice to the receiver that a packet is beginning and also to synch the receiver; in addition the start signal may be coded so that only base stations and remote units for this particular network will respond (there may be overlapping networks owned by different businesses). Next, a 3-byte header 73 is sent, and, as seen in the expansion view, the header contains a 13-bit device-identification field 74 or "handle"; each remote unit 15 also has a serial number of 24-bit length so no two remote units 15 need ever be manufactured having the same serial number, but to save needless transmission of data this field 74 is shortened to a 13-bit handle, allowing $2^{13}$ or 8192 remote units to be on one network with unique handles. This handle is given to the remote unit 15 during an initialization or power-up procedure when the remote unit is connected to a base or host by a direct cable. After the device-ID field 74, the header 73 includes a 5-bit "size" field 75 which says how many bytes of data are to follow, the permitted size being from zero to twenty-two bytes of data. Thus a "byte count" type of protocol is used, as has been used in previous packet-type serial communications protocols. The 5-bit "size" field 75 allows $2^5$ or thirty-two codes to be sent, but only twenty-three are needed for conveying the size information, so if no size information need be sent in a given packet then other commands or messages can be sent in this field, such as a NOP for merely signalling presence of a remote unit or for allowing the base station to send back data if any is waiting. Next, the header 73 contains two 3-bit fields 76 and 77 representing the record number and acknowledgement number, respectively; if an amount of data exceeding 22-bytes must be sent (as when downloading code from the host computer 10 to a remote unit 15 for execution by the remote's CPU 40 when changing operating modes, for example), then this data is split into 22-byte packets which are numbered consecutively, counting modulo-8, and each must be acknowledged by number. In the usual bar code reading transaction, the packets 17 and 18 will be of 22-bytes or less, so the function of the record and acknowledge counting will be of less importance. Following the header 73, a data field 78 of 0-to-22 bytes is transmitted, and a CRC field 79 concludes the packet. The CRC field contains a calculated function of all the bits of the header field 73 and data field 78 for CRC checking; if the receiving device (remote unit 15 or base station) receives a packet 17 or 18 but the CRC calculation of what is received does not agree with the CRC field 79 received, the packet is discarded and not acknowledged, so it will be resent by the transmitting device after a timeout period. As illustrated in FIG. 7, the portion of a packet 17 or 18 after the start symbol 72 is from seven to twenty-nine bytes long; if data to be sent exceeds 22-bytes, then a code can be included in the field 75 (a value above twenty-three) to indicate more is coming.

The remote unit 15 does not have to execute extensive computations while it is either transmitting or receiving packets 17 or 18. Instead, the packet 17 is completely made up in the memory 41 before the transceiver 44 is activated, then during the fixed receive window for the packet 18 the incoming data is merely copied to the memory 41 without interpretation, so all decoding or computation is done after the exchange. This remote unit need not be concerned about receiving any further messages from a base station until the remote unit is ready. The remote unit 15 manages or schedules its own packet communication operations, instead of being a slave of the host or base stations. The base stations 12, 13 and 14, on the other hand, must be ready to receive one of the exchanges of FIG. 2 at any time, so the transceiver 34 must be activated at all times, then when a packet 17 is received it must be immediately decoded, checked, acknowledged by a packet 18, and data sent on to the host computer 10; when a reply message is sent back to this base station from the host computer 10 it must be formatted and stored in memory 31 ready to send back to the remote unit 15 when another exchange of FIG. 2 is initiated by that remote unit 15. During this time, packets 17 may be received from other remote units, and these must be acknowledged with a packet 18 at the 5-msec timing of FIG. 2. Accordingly, the base stations have a much greater computation burden imposed upon the CPU 30, compared to the CPU 40 in a remote unit, and the RF transceiver 34 must operate continuously and recognize incoming signals at any time rather than being off most of the time. The transceiver 34 cannot merely save the received data in memory then shut itself off (the data being evaluated later by the CPU), as is done in the remote units 15.

The RF transmission method used for the packets 17 and 18 of FIGS. 2 and 7, i.e., all packets or replies sent between remote units 15 and base stations 12, 13 and 14, (or RF communication between base stations if this method is used) utilizes the spread spectrum RF modulation technique, i.e., the transmitted signal is spread over a wide frequency band, much wider than the bandwidth required to send the digital information in the packets 17 and 18. Reference is made to R. C. Dixon, "Spread Spectrum Systems", published by Wiley and Sons, 1976, for details of design, construction and operation of this type of RF equipment. A carrier is frequency modulated in the transceivers 44 or 34 by a digital code sequence (stored in memory 41 or memory 31) whose bit rate is much higher than the information signal bandwidth. The information signal bandwidth during one of the packets 17 or 18 is only about 60-KHz (29-bytes of data in about 4-msec in this example). But instead of merely transmitting the 29-byte data packet in its straightforward form, the data to be sent is first expanded or spread to replace each single bit of data with an 11-bit set. That is, each binary "1" becomes "11111111111" and each binary "0" becomes "00000000000"; in the remote unit this expansion is done in the memory 41, by a routine executed by CPU 40, or in the base station it is done in the memory 31 by code executed by the CPU 30. The 11-bit-for-one spreading factor is chosen as a compromise of various RF bandwidth considerations and the like; other spreading factors could be used, but the F.C.C. requires at least a ten-to-one spread so this 11-to-1 is about the minimum. In any event, the 29-bytes or 232-bits of data becomes $11 \times 232$ or 2552 bits in memory 41, plus the 48-bit start symbol, resulting in a 2600-bit message length (maximum) in memory 41. Next, this expanded data is combined (exclusive-ORed) with a pseudorandom binary code value before being used to modulate the carrier; this binary code value is also stored in the memory 41, and the exclusive-OR logic function used to combine the data and code is implemented by instructions executed by the CPU 40 accessing the memory 41. The pseudorandom binary code value chosen is unique to this network, and may be changed under control of the host computer for security or to avoid crosstalk if other networks are operating in overlapped areas. The length of the pseudorandom binary code value, i.e., number of bits before repeating, must be at least 127-bits according to F.C.C. regulations for spread-spectrum transmission in this band; above this value, the length of the pseudorandom code is chosen depending upon security and computation time constraints, and in this example embodiment a value of greater than 2600 is used so there is no repeat during a message frame. The coded data is applied from the memory 41 to the RF transceiver 44 via the bus 42 in parallel or serial format, and the data is used in the transceiver 44 to modulate a carrier in the FSK manner, i.e., each binary "1" causes a voltage-controlled oscillator to operate at one frequency, and each binary "0" causes the oscillator to operate at another preselected frequency. The band specified by the F.C.C. for this type of unregulated and unlicensed use is 902 to 928 MHz, so the oscillator uses a pair of frequencies in this band; as required by the F.C.C. these frequencies are at least one-half the baud rate apart. Each "channel" in this example uses about 0.4 MHz bandwidth, and the channels are 1-MHz apart. The spread spectrum modulation technique chosen for this embodiment of the invention may be characterized as "narrow-band direct sequence", in that the bandwidth of the spread is relatively narrow, about 666,667 chips per second rate, where a "chip" is a discrete signal frequency output from either of the transceivers 34 or 44. That is, the RF transmitted frequency is switched between two discrete frequencies, in this case switching (or potentially switching, depending upon the binary data) every 1.5 microsecond, each of these 1.5 microsecond periods being called a "chip". The RF transceivers are able to operate at a number of different carrier frequencies or "channels" within the band of 902-928 MHz (for example, sixteen different carrier frequencies) so that interference on any particular frequency may be avoided by merely changing to a different frequency, but the transceivers will tend to stay on a single frequency for prolonged periods of time when there is no need to change.

Referring to FIG. 8a, the transmitted signal from a remote unit 15 to base station, or return, is seen to be frequency modulated in a manner to switch between two frequencies, but to dwell at one of these frequencies for a period 80 or "chip" of 1.5 microsecond for this example. This signal is detected and demodulated to produce an analog output voltage as seen in FIG. 8b. The demodulation produces a logic "1" whenever the signal is above a threshold 81 (corresponding to one of the frequencies), or a logic "0" whenever the signal is below this threshold (corresponding to the other of these two frequencies). This detected binary signal is sampled at three times the "chip" rate of 666,667 Hz, i.e., sampled at 2-MHz, producing three "sets" of binary strings A, B and C as seen in FIG. 8c. These three sets are loaded to memory 41 in the remote unit 15 for processing after the packet 18 is received, or examined in a high-speed decoder in the base station in real time as the packet 17 starts to come in. Each one of the sets A, B or C, is tried for a pattern fit by being exclusive-ORed with the first 44-chip pattern (which corresponds to the start symbol 72 of FIG. 7) of the same pseudorandom binary code value used for encoding upon transmission, to see if the 44-bit start symbol 72 is present—if so, the immediately-following chips will upon decoding produce 11-bit strings of "1's" or "0's". Note that the 44-bit start symbol is accepted as "good" even if only about 35-of-44 bits or more match, because the probability of 35-of-44 being a valid transmission instead of noise or a cross-talk signal is very high (for random noise, 22-of-44 will be valid, on average). Likewise, the algorithm used to decode and despread the data part of the message frame or packet may be configured to accept less than full 11-bit strings, i.e., if one or two bits are wrong, there is still a high probability that the data is good, and so the string is accepted as a valid bit anyway.

Referring to FIG. 9, the transceiver 44 in a remote unit 15 is shown in more detail. The transceiver circuitry in connected to the bus 42 by an interface 85 which is connected to an address bus 42a, a data bus 42b and a control bus 42c making up the standard 8088 or V-25 bus 42. The interface 85 contains registers addressable in the I/O space of the CPU 40 to load commands or data to the transceiver 44, or to receive data from the transceiver. The transmitter part of this circuit includes a voltage-controlled oscillator 86 to which is applied serial binary data via line 87 from the memory 41 through the interface 85, using conditioning circuitry 88 as may be required for level shifting. The output 89 of the voltage controlled oscillator 86 is coupled through a power amplifier 90 to a T/R switch and antenna switch 91. This switch circuitry 91 is controlled by a T/R control signal on line 92 and an antenna select signal on line 93 coming from the interface 85. Two printed dipole antennas 45a and 45b are available, so when a transmission fails on one then the other antenna can be tried; the two antennas are positioned in different parts of the housing 55 of the hand-held unit 15, in the example embodiment the antennas are one-quarter wavelength or about 3-inches apart, so, depending upon the environment, one may be found to produce a clear signal when the other does not. I/O instructions executed by the CPU 40 actuate the T/R control and antenna select on lines 92 and 93. A power control 94 is also activated by control lines 95 from the interface 85 (and thus from the CPU 40) to switch on or off the supply voltage going to the transmit circuitry via line 96 or to the receive circuitry via line 97. The transmitter is switched off when not being used to reduce power dissipation, but may be very quickly turned on and brought on line because there are no F.C.C. constraints on spillage in the band used, and the receivers are able to follow the signal by AFC circuitry. The receive circuitry includes an RF amplifier 98, a mixer 99, and an IF amplifier stage 100 filtered at 45-MHz, with the local oscillator being a voltage-controlled oscillator 101 operated by a synthesizer 102 to produce a 947 to 973 MHz frequency (45-MHz above the frequency being used). The synthesizer 102 receives the 2-MHz clock from the CPU 40 via line 103, and generates inputs to a differential amplifier 104 whose output controls the oscillator 101, with feedback from the oscillator output through an appropriate divider 105. The particular frequency of operation is selected in the synthesizer 102 by a binary code loaded to input 106 via interface 85 from the CPU 40. The output 107 of the IF stage 100 is applied to a detector 108 responding to the FSK modulation to produce a serial binary data output on a line 109 corresponding to FIG. 8b, and this data output 109 is applied to the interface 85 to be sampled at 3× the chip rate as explained above to produce the three binary datastreams A, B and C to be loaded to the memory 41. The detector circuit 108 also produces an automatic frequency control or AFC output 110 via differential amplifier 111, and this AFC voltage is fed back ot the conditioning circuitry 88 for the voltage-controlled oscillator 86 of the transmitter. Thus, while the transmitter is operating, the receive channel is also powered up to produce the AFC voltage on line 110 to adjust the frequency of the oscillator 86. In addition, the detector 108 produces a voltage on the line 112 representing the signal strength when in the receive mode, and this voltage is available to be read by the CPU 40 at the interface 85; in this way the signals produced by the antennas 45a and 45b can be compared, and the also various available frequencies checked for RF signal levels. This information may be used in an algorithm to select the optimum transmit/receive channel. The circuit of FIG. 9 may be constructed with commercially-available integrated circuit devices; for example, an MMBR901 device may be used for the oscillators 86 and 101 and RF amplifier 98, the power amplifier 90 may include this MMBR901 device and an MMBR571 device, the synthesizer 102 may be an MC145158 device, and the detector 108 may be an MC13055 device. PIN diodes are used for the antenna select switches and the T/R switch in the circuitry 91. The range of a transmitter of this construction is about 500 feet, in a commercial environment, at a power of about one watt; the transceiver consumes about 100 mA in the receive mode and about 450 mA in a transmit mode.

Referring now to FIG. 10, the transceiver 34 is shown in more detail. This circuitry may be in large part the same as that of FIG. 9, with certain critical exceptions. The oscillator 86 with its conditioning circuit 88 and AFC feedback 110 is the same, as is the power amplifier 90. The power supply control 94 of FIG. 9 is not used in the base station, however, because the receiver must be operating at all times and of course there is no concern for battery drain. Serial binary data from the memory 31 is applied to input 87 from the interface 85 which is connected to the bus 32 consisting of a 16-bit address bus 32a, a 15-bit port bus 32b, a control bus 32c and a 24-bit data bus 32d, as is defined for the DSP56001 device used in one example; if a V-25 microprocessor is used, then of course the bus 32 will correspond to an 8088-type bus. The port bus 32b for a DSP56001 has fifteen lines used as either inputs or outputs by the microprocessor device 30, and so these can be used in place of the I/O registers mentioned above for the 8088 device in FIG. 9. The RF amplifier 98, mixer 99 and IF amplifier 100 are the same as in FIG. 9, as is the local oscillator 101, and the synthesizer 102. The binary input 106 to select the frequency of the synthesizer may be parallel rather than serial, for loading from the port bus 32b via interface 85. The transmit/receive selector circuit 91 is the same as in the remote units 15, but the antenna select may have more than two antennas, i.e., antennas 35a, 35b, 35n to select from (for example, eight), and the antenna select control on lines 92 is therefore more than one bit. The CPU 30 sends a multi-bit control via port bus 32b to select the antenna 35a, 35b...35n to be used. An important difference is that the serial data output from the detector 108 on line 109 is connected to a dedicated 144-bit (i.e., 3×48-bit) shift register 115 which is clocked at 2-MHz by clock input 116 from the CPU 30, to look for the 48-chip start symbol 72 in real time. In this manner, the most recent 144-bits of received, detected, sampled RF, representing forty-eight chips 80 of the signal of FIG. 8a detected as seen in FIG. 8b, and sampled at the rate seen in FIG. 8c, are available in the register 115 at any given time. The content of this shift register 115 is decoded in real time, evaluated once every 2-MHz clock period, by a decoder 117 representing the pseudorandom binary code value used in the exclusive-OR function in the remote unit 15 to encode the data. This code value may be changed in the decoder 117 by loading a new binary number from the CPU 30 via interface 85 using the port bus 32b and input 118. Or, alternatively, the code used in the decoder 117 may be fixed by using a PROM device for this network or for this particular base station. When a valid 48-bit start signal 72 of a packet 17 is recognized in the decoder 117, using whatever level of confidence is selected (all the bits need not be valid), a signal is produced on the output 119 to the interface 85, which is recognized by the CPU 30 to mean that a valid packet 17 is incoming and so the serial data on line 109 is from that point copied to memory 31 through the intermediary of loading serially to a register in the CPU 30 then the CPU executes move instructions to load to the memory. Since only one of every three samples is the best data, then only every third bit need be transferred to the memory 31, or it can all be loaded and the CPU 30 can discard 2/3 of the incoming data on line 109. Another difference in this transceiver circuitry of FIG. 10, compared to FIG. 9, is that the RF signal strength output 112 from the demodulator 108 is an analog signal applied to a level detector 120 which receives a multi-bit value on lines 121 from the port bus 32b, so an output 122 from this threshold level detector 121 is available to be read by the CPU 30 via its port bus 32b. In this manner, the CPU 30 executes an algorithm to check the RF channels by switching RF frequencies among the sixteen or so available (via input 106 to the synthesizer), switching the antennas (via input 92 to the antenna select), and defining the level to look for (via lines 121), while for each trial copying the output 122 to memory 31. The optimum frequency for the carrier (in the 902 to 928 MHz band), and the optimum antenna 35a to 35n, can thus be selected.

Figure 11B:
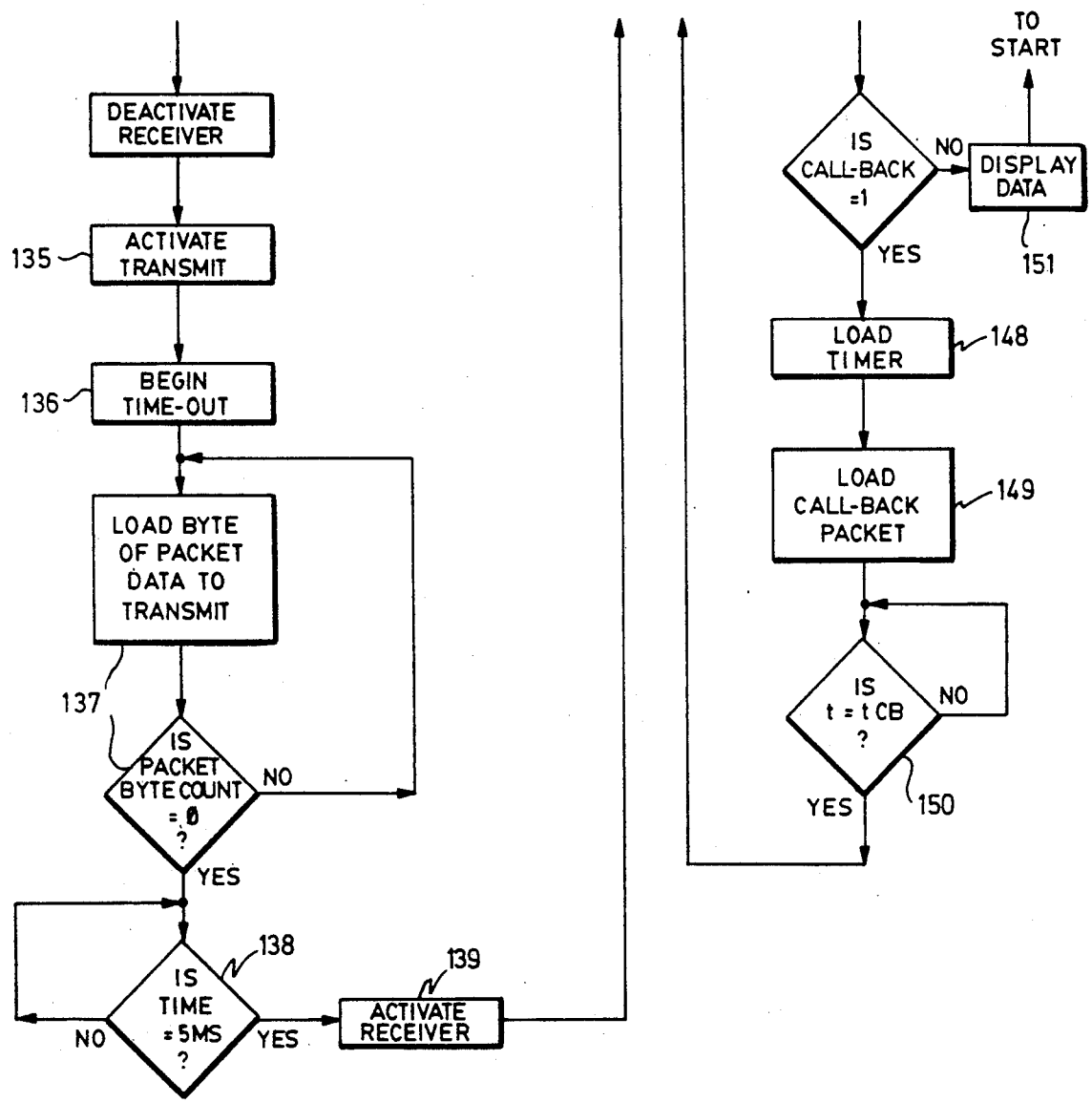

Referring to FIG. 11, a flow chart of one example of a type of program executed by the CPU 40 in the remote unit 15 is illustrated. For this example it is assumed that the laser-scan bar code reader of FIG. 5 is being used as the data gathering device. The idle state of the program is a loop indicated by decision block 125 which tests to see if the trigger 54 is pulled, and when "yes" the scan is initiated by activating the laser source 58 and the scan motor 60, indicated by the block 126. The CPU 40 then enters a loop 127 to wait for bar code data from the device 43; if no valid bar code data is detected by the end of a time-out period indicated by decision point 128, then control is returned to the start loop 125. If bar code data is detected, then block 129 is entered to load the bar code data to the memory 41 and check its validity using whatever criteria is appropriate for the specific use. Next, the decision point 130 determines whether or not a packet transmission is needed, and if so a routine 131 is entered to make up the packet by adding the start symbol 72, header 73 and the CRC field 79; if the byte count is less than twenty-nine for the data field 78, then nulls are added after the CRC field to provide a fixed transmission time. A routine 132 is then used to spread and encode the packet, and next the receiver is activated at point 133 by signalling the power supply 94 to apply supply voltage to the receive components via line 97 in FIG. 9. The CPU then queries the output 112 to see if the channel is quiet, indicated by decision point 134; if not, a wait loop 135 is entered to delay a selected time before retrying by going back into the activate receiver block 133. If the channel is quiet, the receiver is deactivated, and the transmitter circuitry is activated at the block 135, and a timer started to define the time periods of FIG. 2, indicated by the block 136. Bytes of the transmit packet 17 are loaded from the memory 41 to the transmitter by a loop routine 137 which counts the bytes, and when all have been loaded the time-out to determine the time $t_2$ is entered at decision block 138. When the time-out is reached, the receiver is activated at point 139, and a loop 140 is entered to load all of the A, B and C samples from the transmitter to the memory 41. When $t_2+t_4$ is reached, the receiver is deactivated at block 141, and the CPU enters a routine 142 to test each of the A, B and C sample data streams corresponding to the time $t_3$ to generate a correlate-level indicating the degree to which there is correlation with the expected start-symbol decode for a valid packet. The highest correlate-level is picked (A, B or C), and tested at decision point 143 against the threshold established for assuming a good packet (e.g., 41-of-48). If this test fails, then it is assumed there was no acknowledge packet 18 received, and the packet is resent by re-entering the flow at block 133 via path 144. If the test passes, then the CPU decodes and despreads the selected A, B or C data stream, at blocks 145, and performs a CRC check at point 146. If CRC fails, the packet 18 is discarded and the path 144 to resend is entered. If CRC passes, the CPU enters a routine 147 to see if a call-back request is included in the data in the packet 18, and if so then a timer is loaded at point 148 to begin counting down the period requested by the base station in the acknowledge packet. A standard call-back packet 17 is generated in the memory 41 by a routine 149, containing no data field but merely functioning to allow the base to send data to this remote unit. A loop 150 is entered to wait for time-out of the period set in block 148, and when reached the transmit function is entered by path 144. If no call-back request was present, then the CPU takes whatever action dictated by the data, ordinarily including displaying received data at block 151, then re-enters the start loop 125.

It is to be noted that the direct sequence spread spectrum RF modulation technique used in the example embodiment is to be distinguished from the frequency-hopping method in some spread spectrum systems; the frequency-hopping method consists of "spreading" a small number of data bits to a large number of chips of many different frequencies with a pseudo noise generator, i.e., pseudorandom spreading over a large number of frequencies (also called "fast hopping") rather than the direct sequence method used here. The pseudorandom fast hop method would be less suited for this system because the RF circuitry needed in the remote unit as illustrated in FIG. 9 would be more complex and expensive. Use of a smaller pseudorandom number of hops ("slow" hopping) is also more complex from an RF standpoint, and presents marginal F.C.C. compliance problems. Thus the direct sequence approach employing only two frequencies is better suited for the present system, as the complexity is imposed upon the CPU to code and decode binary data, rather than upon the RF section to generate rapid switching of frequencies among a widely spread number of alternatives.

The pseudorandom binary code value used to "exclusive-OR" with the data need not use an error-correcting code (although an error-correcting code may be used if desired). In the procedure used it is not intended to combat impulse noise in the RF spectrum. If a transmitted packet 17 or 18 gets clobbered by noise, then it will not be recognized by the decoder 117, or by the equivalent software decode from memory 41 in the remote unit 15, and so the packet will be retransmitted; if the remote unit 15 does not receive a packet 18 it will retransmit its packet 17 after a timeout period.

The modulation method used in the transceivers 34 and 46 is noncoherent FSK (frequency shift keying). This technique is vulnerable to certain kinds of jamming, such as a strong single frequency (noise) within the 902-928 MHz band. This band is used for all types of equipment, with no restrictions, and may be used by RF melting equipment, etc., in the area. If jamming of this type occurs, the algorithms executed by the CPU 30 in the base station may be used to recognize the very high error level via input 122 and so a command is sent to the synthesizer 102 in the RF transceiver 34 to select another of its sixteen frequency bands, and hopefully the new one allows better transmission. The feature of the RF transceiver 34 in a base station being able to measure the instantaneous RF energy at output 122 within any of the sixteen bands it can use, is an important one; this allows selection of the quietest bands available for the frequency used for the exchanges via packets 17 and 18.

The transceiver 34 in the base station responds to the synchronizing start signal 72 of a packet 17 in real time by means of the register 115 and decoder 117, in contrast to the remote unit 15. The remote unit serializes the packet or chip sequence to the RF transmitter oscillator 86, then waits a precise amount of time (about 5-msec), as established by a timer register controlled by the CPU 40 counting the 2-MHz clock, and then samples the output 109 of the RF receiver 108 at precisely three times the chip rate as seen in FIG. 8c. The samples are divided into three sample streams A, B and C, each datastream slightly longer than one packet 18 time, and stored in the memory 41. These sampled data strings are presumed to be a response packet 18 from the base. The CPUs 30 and 40 are of course asynchronous, but the timing of the 2-MHz clocks for these CPUs in the remote units 15 and the base stations 12, 13 and 14 should be matched to within about 40-ppm (parts per million, i.e., chips or 1.5-microsec periods of drift per million chips) so that during detection of one of the packets 17 or 18, which are a maximum of 2600 chips in length, the drift does not exceed a small fraction of a chip, i.e., a very small part of 1.5 microsec. This clock accuracy is available with low cost crystal oscillators.

After the received data is in the memory 41, the code executed by the CPU 40 determines which of the three sample streams to use, and where in that stream the record starts. There are three levels of synchronization that the remote unit 15 must achieve: phase sync, symbol sync and packet sync. Phase sync has to do with finding which of the three samples A, B and C per chip is nearest the center of the chip, and therefore most likely to represent the true value of that chip; as seen in FIG. 8c, one of the sample sets A, B or C is usually more likely to be at about the center of the waveform of FIG. 8b so this one will be most accurate, but one or two of the sets will be near the transition points and so will be the most indeterminate. Symbol sync is the alignment of the incoming chip stream with the starting point of the >2600-bit long binary code value. Finally, record or packet sync is finding the beginning of the packet 17 or 18. Since all transmissions to a remote unit 15 begin with a fixed chip pattern (the synchronizing signal 72), the remote unit 15 accomplishes all three levels of synchronization at once by examining the first few samples. To give a simplified example, suppose the fixed chip pattern is eight chips long and the record is believed to have started within a six microsecond (4-chip) window. At three samples per chip, there are twelve places where the packet 18 may have started. For each potential starting place, the corresponding 8-chip sequence is extracted and with a table lookup compared with the desired sequence; if one is found to be an exact match or very close, then most probably all three synchronizations have been accomplished. Unlike some conventional spread spectrum methods, once phase sync is accomplished there is no need for phase tracking because the transmitted packets 17 and 18 are so short and there are practically no Doppler effects; the remote units 15 are either stationary or moving at very low speeds at the time of transmission. If the best match that can be found in the table lookup is not very good, the packet 18 is discarded at this point and a new exchange is initiated, using the alternate antenna or another frequency.

A hand-off protocol is used to assign each remote unit 15 to a specific base station. It is essential that only one base station 12, 13 or 14 be assigned to a remote unit 15 at a given time; otherwise two base stations might respond simultaneously to a packet 17 when a remote unit attempts an exchange and the two acknowledge packets 18 would interfere with each other. Before any base station will respond to a remote unit at all, the base station must receive the serial number or device ID for a remote unit 15 from the host computer 10 via link 11 and make a table entry in its memory 31. All base stations receive this same memory 31. All base stations receive this same number from the host, but only one base station arbitrarily assigns itself to this remote unit using some algorithm; for example, the base stations may merely select remote units based upon the serial numbers or device IDs. If a base station receives a packet 17 from one of its remote units (having the device ID corresponding to one in its list), this base station sends an acknowledge packet 18 responding to the exchange and records in its memory 31 the time and quality (number of errors) of the data packet 17. Any of the other base stations also receiving this packet 17 of the exchange from this remote unit merely record the time and quality. Every minute or so, each base station publishes (sends to the other base stations via link 11) the list of remote units it has heard from in the last minute and the quality. If another base station has a much higher quality rating than the one initially assigned, the assignment for this particular remote unit moves by messages exchanged between the two base stations involved. At any one time, each base station has in memory a list of the serial numbers (or ID numbers) of the remote units it will respond to, and whenever a packet 17 is received the ID number in the field 74 is compared to the list in memory to see whether a response packet 18 is to be sent from this base station.

There are many reasons why a remote unit 15 may receive no response to an exchange as in FIG. 2 that it initiates, and for each reason, a different strategy is available to regain communication. One problem is that a remote unit has moved out of range of one base station, but is still within the range of another station. In this case the remote unit sends a "distress call", which is a short packet 17 consisting of little more than the standard synchronization signal 72 and its serial number. This packet is sent twice, once from each of the two antenna 35a and 35b. For this special type of exchange the response may come a fixed amount of time after either the first or second such packet 17. A longer delay time e.g., 100-msec, is allowed for the response packet 18 to permit any base station hearing the distress call to communicate by an exchange with the base station normally in charge of this remote unit. After the base station in charge has heard from all other base stations which heard the call, it can determine which one should be the new base station in charge and "pass the baton" to that base station in time for that base station to send the response packet 18. The response will indicate which antenna worked the best, i.e., produced the fewest errors. If the remote unit receives no response to this distress call, this remote unit is probably out of range of all base stations at the moment (inside a metal truck, for instance), and the distress call is tried again later after a time out period. After several minutes of being out of communication the algorithm executed in this remote unit will conclude that the network operation frequency has changed and distress calls will be sent on the other frequencies, one at a time.

An important feature of one embodiment of the invention is the measurement of the quality factor of the received packets 17 at the base stations 12, 13 and 14. As noted above, this quality factor is used in determining which remote unit is assigned to which base station, either initially, or in periodic realignments, or upon a distress call. The quality factor is the number of valid bits resulting from the decode of the 44-bit start symbol 72 at the decoder 117; the packet is accepted as good data even if the number of valid bits found when comparing the incoming symbol 72 with a stored version of the correct pseudo-random code is (in the example) 35-of-44, but this number is saved in memory 31 even if it is in the 35-to-44 range and is used to determine which base station is getting the best signal from a given remote unit. That is, the assigned base station may be able to receive and decode the incoming packets quite adequately, but it may be averaging a quality factor of thirty-eight, whereas another base station may be receiving these same packets with a quality factor of forty-four, so obviously the later is in a more favorable receiving situation with respect to the remote unit in question and so the next time a set of messages are exchanged between base stations, the baton should be passed to the base station receiving better quality. Note that this quality factor is different from merely measuring the signal strength, which is less significant in this type of environment due to the high degree of multipathing; also, the signal strength varies with distance, and can vary orders of magnitude and still give perfect reception. Just measuring the RF level won't tell what the noise and interference environment is. Also, it is noted that since error detection and correction is not employed in this system because it is very compute intensive, there is no quality measure available short of a catastrophic failure (which would occur when the CRC didn't check), and so the use of this correlation number from the decode of the start symbol 72 provides a measure that can give an early indication of deteriorating signal, long before the signal gets so bad it would be unusable. The quality factor (correlation coefficient for start symbol 72) can be used in conjunction with the RF signal strength indication available at the input 121 in a base station; if the correlation is bad but the RF signal strength is good, there is a frequency problem and so the channel is changed, but if correlation is bad and signal strength is bad, the base station is changed by baton passing.

Although the 24-bit serial number of every remote unit ever to be manufactured is probably unique ($2^{24}$ is 16-million), most remote unit message packets 17 have only a 13-bit handle or nickname in their message header field 74. If two networks of FIG. 1 are in overlapping areas, their messages could get mixed up; at a trade show, for example, several of these networks could be in the same RF space. The base stations of each network can pick a different frequency to use during the initialization period when all frequencies are checked for noise or traffic, and further the initial messages from each remote unit can require the full serial number. A much more secure technique dictates the use of a different random chipping pattern for each network, i.e., a different pseudorandom binary code used to exclusive-OR the data with. Then two networks would be unable to decipher each other's messages, or even detect the presence of each other; there would be added collisions but the packets of one would be totally undecipherable to another network. This technique of using different chipping patterns, however, requires that the network manager (a human being) initializes each remote terminal. To this end, each remote unit 15 has an RS-232 connector (coupled to the bus 42) which is coupled to the host computer 10 temporarily for initialization, at which time the unique pseudorandom binary code value is loaded to the memory 41 and thereafter used in the exclusive-OR function. The handle to be used as the ID field 74 of a packet 17 is also loaded at this time. Base stations connected to the host computer 10 through a cable 11 are initialized over this cable. Base stations connected to the host computer 10 only through an RF link (e.g., base station 14 as illustrated in FIG. 1) could use a default chipping pattern which is used only for initialization but preferably are temporarily connected by the serial link 11 for initialization then later operate by the RF link. A base station may be programmed to change to this default pattern on command from the host computer or when out of communication for a long time. An alternative method for security in overlapping networks requires every message packet 17 or 18 to contain the full 24-bit serial number of the remote unit. This adds 11-bits to the header overhead, and assumes that the manufacturer can always control the serial numbers in all devices to be made.

In one embodiment, a different binary code sequence is used in the spreading and encoding steps in each base station and its assigned remote units. In this case, one of the remote units 15 can be executing an exchange with its base station 12, 13 or 14, while at the same time another remote unit 15 is executing an exchange with its base station, even if the two pairs are within RF range of each other; this is one of the advantages of the spread spectrum technique, in that several simultaneous transmissions in the same band can be separated by using different code. Alternatively, if each of these base stations is using a different frequency in the 902-928 MHz band in its communications with its remote units, then likewise simultaneous exchanges can be executed. Up to about a thousand of the remote units 15 can be supported in a local area if the average duty cycle is low. Without invoking protocol features to minimize collisions, each base station can sustain about twenty-five randomly occurring exchanges per second. The limiting factor then becomes the host computer 10, and the transaction processing power of the host can be expanded by using faster clock speed, higher MIPS rate, parallel processors, and known techniques of this type.

While the invention has been described with reference to a specific embodiments, the description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of transmitting data packets from one of a plurality of remote terminal units to a base station, comprising the steps of:
    (a) transmitting a data packet from said one unit to said base station during a first time period selected by the unit;
    (b) receiving at said one unit from said base station an acknowledge signal during a second time period occurring only a fixed time delay after said first time period, said second time period being the same for at least some of said units.

2. A method according to claim 1 wherein said step of transmitting is by an RF signal, and said step of receiving includes receiving an RF signal.

3. A method according to claim 2 wherein said RF signal is of the spread spectrum type.

4. A method according to claim 3 wherein said spread spectrum RF signal is of the direct sequence type.

5. A method according to claim 1 wherein said transmitted data packet and said acknowledge signal each include identification of said remote terminal unit.

6. A method according to claim 5 wherein said unit is one of a plurality of remote stations associated with the transmitter of said acknowledge signal.

7. A method according to claim 6 wherein said remote stations are hand-held data-gathering units which include manual control elements.

8. A method according to claim 6 wherein at least some of said remote stations include bar-code reading devices.

9. A method according to claim 1 wherein said stations each include a processor executing instructions stored in a memory and said data packet and said acknowledge signal are both also stored in said memory in binary format.

10. A method according to claim 9 wherein said data packet is encoded by said processor executing instructions, and said acknowledge signal is decoded by said processor executing instructions.

11. A method according to claim 10 wherein said transmitted data packet and said acknowledge signal are RF signals of the direct sequence spread spectrum type.

12. A method according to claim 11 wherein said acknowledge signal is transmitted by a second station which is one of a plurality of like second stations, and each one of said second stations is coupled for communication to a central computer.

13. A method according to claim 12 including the step of sending data packets to said central computer from said second stations by a serial communications link.

14. A method according to claim 1 wherein said acknowledge signal is transmitted by a second station which is one of a plurality of said second stations physically spaced from one another, and there are a plurality of said units for each said second station.

15. A method according to claim 14 wherein each one of said units is identified by a unique code and said transmitted data packet includes said unique code, and said acknowledge signal also includes said unique code.

16. A method according to claim 1 including the step of receiving at said unit prior to said step of transmitting said data packet to detect transmission by other like units.

17. A method according to claim 16 wherein there are a plurality of said units, each identified by a unique code transmitted with said data packet and with said acknowledge signal.

18. A method according to claim 17 wherein said units each include a processor executing instructions stored in a memory, and said acknowledge signal is first loaded to said memory and then decoded.

19. A method according to claim 18 wherein at least some of said units include hand-held bar-code scanners or readers.

20. A method according to claim 19 wherein at least some of said units include keyboard inputs and visual displays scanned by said processor.

21. A system for transmitting data packets from one of a plurality of first stations to a second station, comprising:
    (a) a transmitter in said one first station for transmitting a data packet from said one first station to the second station during a first time period selected by said one first station;
    (b) a receiver in said one first station for receiving an acknowledge signal from the second station during a second time period occurring only in a time window referenced to said first time period by a fixed delay, said fixed delay being the same for all said plurality of first stations.

22. A system according to claim 21 wherein said transmitted data packet is sent by an RF signal, and said acknowledge signal is an RF signal.

23. A system according to claim 22 wherein said RF signal is of the spread spectrum type.

24. A system according to claim 23 wherein said spread spectrum RF signal is of the direct sequence type.

25. A system according to claim 21 wherein said transmitted data packet includes identification of said first station, and said acknowledge signal includes identification of said first station.

26. A system according to claim 25 wherein said first station is one of a plurality of remote stations associated with said second station.

27. A system according to claim 26 wherein said remote stations are hand-held data-gathering units which include manual control elements.

28. A system according to claim 27 wherein said units each include a processor executing instructions stored in a memory.

29. A system according to claim 28 wherein at least some of said units include bar-code scanners.

30. A system according to claim 29 wherein at least some of said units include keyboard inputs and visual displays.

31. A system according to claim 30 wherein said transmitted data packet and said acknowledge signal are RF signals of the direct sequence spread spectrum type.

32. A system according to claim 31 wherein there are a plurality of said second stations, and a plurality of said first stations for each said second station.

33. A system according to claim 32 wherein all of said plurality of second stations are coupled to a host station by a communication link.

34. A system according to claim 33 wherein each of said second stations includes a decoder for decoding the data packet sent by a first station to produce digital data to send to said host station.

35. A system according to claim 21 wherein the transmitter at said first station receives prior to transmitting said data packet to detect transmission by other stations.

36. A system according to claim 35 wherein there are a plurality of said first stations, each identified by a unique code transmitted with said data packet and with said acknowledge signal.

37. A system according to claim 36 wherein said first stations each include a processor executing instructions stored in a memory, and said acknowledge signal is first loaded to said memory and then decoded.

38. A system according to claim 37 wherein at least some of said first stations include hand-held bar-code scanners.

39. A system according to claim 38 wherein at least some of said units include keyboard inputs and visual displays scanned by said processor.

40. A method of data transmission between a plurality of terminals and a base station, comprising the steps of:
(a) transmitting a data packet from one of said terminals to said base station at a time selected by said one of said terminals, the data packet including identification of said one of the terminals; transmitting an acknowledgement from the base station to said one of said terminals in a predetermined time window, at least part of said predetermined time window being the same for all of said terminals, said acknowledgement including identification of said terminal;
(c) receiving said acknowledgement at said one terminal during said predetermined time window.

41. A method according to claim 40 including the step of first receiving at said one terminal to detect transmission by another of said plurality of terminals, before transmitting said data packet.

42. A method according to claim 40 wherein said transmitting is by wireless RF.

43. A method according to claim 42 wherein said RF is modulated by the spread spectrum technique.

44. A method according to claim 43 wherein said spread spectrum technique employs a sequence of frequency shifts between two frequencies.

45. A method according to claim 44 including the steps of forming said data packet in a memory by expanding a multi-byte packet to create an expanded packet then producing in said memory an exclusive-OR of said expanded packet and a fixed pseudorandom sequence of bits.

46. A method according to claim 45 wherein said multi-byte packet includes the results of reading a bar code symbol.

47. A method according to claim 40 wherein said acknowledgement includes data to be transferred from said base station to said one terminal.

48. A method according to claim 40 wherein said one terminal is responsive to transmission from said base station only during said time window.

49. A method according to claim 48 wherein said time window has a starting point occurring a fixed time from the beginning of said transmitted data packet.

50. A data communication system comprising:
(a) a host computer including a data communication input/output port;
(b) a plurality of base stations; each base station having a data communication input/output port; said data communication input/output ports of the host computer and at least one of said base stations being connected by a data communications link; each of the base stations having an RF transmitter/receiver responsive to received encoded RF signal packets and transmitting RF acknowledge signal packets; each of the base stations producing digital data corresponding to said received encoded RF signal packets, and storing said digital data for transferring to said host computer via said data communication input/output port and said data communications link;
(c) a plurality of remote units, each remote unit located for sending said encoded RF signal packets to one of said base stations at a time selected by the remote unit and receiving said RF acknowledge signal packets from one of said base stations in a fixed time window, each of the remote units having:
(i) a memory for storing data from a local data source, and a processor for transferring data to and from the memory;
(ii) an RF transmitter/receiver having a modulator for modulating an outgoing carrier with data from said memory to produce said encoded RF signal packets, and a detector responsive to RF signals received by said RF transmitter/receiver to detect RF acknowledge signal packets from the base station in said fixed time window.

51. A system according to claim 50 wherein at least some of said remote units are hand-held bar code readers and said local data source of each such remote unit produces decoded bar code data for loading to said memory under control of said processor.

52. A system according to claim 50 wherein said RF signals are spread spectrum modulated signals of the direct sequence type.

53. A system according to claim 50 wherein said communication link is a serial data link by which data packets are sent from base station to host computer or base station to base station, or sent from host computer to base station.

54. A system according to claim 50 wherein said base stations receive said encoded RF signal packets only from a predetermined subset of said plurality of said remote units.

55. A system according to claim 54 wherein said encoded RF signals include a header containing synchronizing signals followed by a block of data signals.

56. A system according to claim 50 wherein each one of said remote units is identified by a unique identifying code contained in said encoded RF signals transmitted by the remote unit, and wherein said base stations are responsive to said unique identifying code to allow only one of the base stations to send said RF acknowledge signals to each separate remote unit.

57. A system according to claim 56 wherein each one of said base stations is responsive to all of the encoded RF signals from all of the remote units within range, and detects the number of errors occurring in reception from each one of the remote units in said encoded RF signals.

58. A system according to claim 57 wherein a representation of said number of errors is transmitted to other of said base stations via said communication link to specify the unique codes of remote units each base station is to be responsive to by sending said RF acknowledge signals, said information being derived from said representation of number of errors.

59. A system according to claim 58 wherein at least some of said remote units are hand-held bar code readers.

60. A data communication system comprising:
(a) at least one base station; each base station having an RF transmitter/receiver responsive to encoded RF signal packets and producing RF acknowledge packets; each base station decoding said encoded RF signal packets received by said RF transmitter/receiver and producing digital data corresponding thereto;
(b) a plurality of remote units each located for sending said encoded RF signal packets to at least one of said base stations and receiving said RF acknowledge packets from one of said base stations, each of the remote units having:
(i) a data source, a memory for storing data from the data source, and a processor for transferring data to and from the memory;
(ii) an RF transmitter/receiver producing said encoded RF signal packets containing data from said memory and detecting said RF acknowledge packets from a base station to load data from detected packets to said memory, wherein said RF transmitter/receiver in said remote unit is activated for detecting an RF acknowledge packet only during a fixed time window following transmission of an encoded RF signal packet.

61. A system according to claim 60 wherein said remote units are hand-held bar code readers or the like and said data source of each remote unit produces decoded bar code data.

62. A system according to claim 60 wherein said RF signals are spread spectrum modulated signals of the direct sequence type.

63. A system according to claim 60 wherein each said base station receives said encoded RF signal packets from a plurality of said remote units, and each RF signal packet includes a unique identifying code for a remote unit.

64. A system according to claim 60 wherein said encoded RF signals include a header containing synchronizing signals followed by a block of data signals.

65. A system according to claim 64 wherein each one of said remote units is identified by a unique identifying code contained in said header of said encoded RF signal packets transmitted by the remote unit, and wherein each said base station is responsive to said unique identifying code for only predetermined ones of said plurality of remote units.

66. A system according to claim 60 wherein said RF transmitter/receiver in said remote unit is activated by said processor for detecting said RF acknowledge packet only during a fixed time window following transmission of said encoded RF signal packet.

67. A system according to claim 66 wherein said RF transmitter/receiver in a remote unit sends said RF signal packet only after receiving to detect any other RF signal from another remote unit which may be present.

68. A system according to claim 67 wherein said base station decodes said RF signal packet while said RF signal packet is being received, and said remote unit decodes said RF acknowledge signal after said RF acknowledge signal has been received by accessing said memory via said processor.

69. A system according to claim 68 wherein said base station decodes said RF signal packet by loading detected data corresponding to the signal serially into a register and decoding bits of said register in parallel.

70. A method of receiving a direct sequence spread spectrum RF signal having a given chip rate, comprising the steps of:
(a) detecting the RF signal to produce an output correlated with modulation of the RF signal;
(b) sampling said output at a multiple of said chip rate to produce a plurality of separate time-shifted data strings each at said chip rate;
(c) comparing each of said data strings with a binary code corresponding to that used for generating a chipping sequence of said RF signal.

71. A method according to claim 70 including the step of storing said data strings in memory and wherein said step of comparing is by accessing said memory by a processor after said RF signal has been received.

72. A method according to claim 70 including the step of loading all of said data strings into a shift register and wherein said step of comparing is by decoding bits of said shift register while said RF signal is being received.

73. A method according to claim 71 wherein said steps are performed by a remote, hand-held, battery-operated unit.

74. A method according to claim 73 wherein said RF signal is a packet of known maximum length, and said packet starts with a synchronizing signal.

75. A method according to claim 74 wherein said steps of detecting, sampling and comparing are performed only in a time window established by an RF transmission from said unit.

76. A method of operating a packet communications system, comprising the steps of:
 (a) sending a data packet from a remote terminal to a base station and waiting to receive an acknowledgement from the base station;
 (b) if an acknowledgement is not received, then sending a distress packet from said remote terminal;
 (c) receiving said distress packet at a plurality of base stations, and, at each one of said base stations, sending a message to other of said base stations indicating the identity of said remote terminal and the quality of reception of said distress packet;
 (d) at a base station, comparing said messages to select one of said base stations to be designated for communication with said remote terminal.

77. A method according to claim 76 including the step of sending a packet to said remote terminal from said designated base station to acknowledge said distress signal.

78. A method according to claim 77 wherein said packet is sent to said remote terminal after a predetermined time period has elapsed since said step of sending said distress signal.

79. A method according to claim 77 wherein said remote terminal is responsive to said packet from said designated base station only during a fixed time window.

80. A method according to claim 77 wherein said data packet, said distress packet and said acknowledge packet all contain an identifying code for said remote terminal.

81. A method according to claim 76 wherein said steps of sending are by RF transmission.

82. A method according to claim 81 wherein said RF transmission employs spread spectrum modulation.

83. A method according to claim 76 wherein only one of said base stations sends acknowledgement packets to said remote terminal.

84. A method according to claim 83 wherein there are a plurality of said remote terminals.

* * * * *

UNITED STATES PATENT AND TRADEMARK OFFICE
CERTIFICATE OF CORRECTION

PATENT NO. : 5,029,183  
DATED : July 2, 1991  
INVENTOR(S) : LaRoy TYMES

It is certified that error appears in the above-identified patent and that said Letters Patent is hereby corrected as shown below:

Column 2, line 34, change "terminals" to --terminal--;  
               line 53, change "ar" to --are--.  
    Column 3, line 1, change "form" to --from--;  
               line 2, change "being" to --begin--;  
               line 20, change "indifferent" to --in different--;  
               line 64, change "eah" to --each--.  
    Column 4, line 48, change "5a" to --11a--.  
    Column 6, line 2, change "acknoledge" to --acknowledge--;  
               line 33, change "intries" to --entries--;  
               line 41, change "comples" to --couples--.  
    Column 7, line 63, change "calbe" to --cable--.  
    Column 8, line 30, change "a peripheral" to --A peripheral--.  
    Column 9, line 5, change "bases" to --base--;  
               line 27, change "CPROM" to --EPROM--;  
               line 36, change "te" to --the--; change "begin" to --being--.

UNITED STATES PATENT AND TRADEMARK OFFICE
CERTIFICATE OF CORRECTION

PATENT NO. : 5,029,183

DATED : July 2, 1991

INVENTOR(S) : LaRoy TYMES

It is certified that error appears in the above-identified patent and that said Letters Patent is hereby corrected as shown below:

Column 25, line 60 (claim 40), after "terminals;" insert (as a new subparagraph) --(b) receiving said transmitted data packet at said base station and--.

Signed and Sealed this

Second Day of March, 1993

Attest:

STEPHEN G. KUNIN

Attesting Officer

Acting Commissioner of Patents and Trademarks

UNITED STATES PATENT AND TRADEMARK OFFICE
CERTIFICATE OF CORRECTION

PATENT NO. : 5,029,183
DATED      : July 2, 1991
INVENTOR(S) : LaRoy TYMES

It is certified that error appears in the above-identified patent and that said Letters Patent are hereby corrected as shown below:

Front Page, under item [56] References Cited, add

- - 4,689,786   8/87   Sidhu et al. .....370/95
    4,697,281   9/87   O'Sullivan .......379/59
    4,689,785   8/87   Toyanaga .........370/85
    4,332,027   5/82   Malcolm et al. ...370/94  - -

Signed and Sealed this

Sixth Day of April, 1993

Attest:

STEPHEN G. KUNIN

Attesting Officer

Acting Commissioner of Patents and Trademarks

(12) EX PARTE REEXAMINATION CERTIFICATE (6452nd)
United States Patent
Tymes

(10) Number: US 5,029,183 C1
(45) Certificate Issued: Sep. 30, 2008

(54) PACKET DATA COMMUNICATION NETWORK

(75) Inventor: LaRoy Tymes, Palo Alto, CA (US)

(73) Assignee: JPMorgan Chase Bank, N.A., New York, NY (US)

Reexamination Request:
No. 90/007,617, Jul. 6, 2005

Reexamination Certificate for:
Patent No.: 5,029,183
Issued: Jul. 2, 1991
Appl. No.: 07/374,452
Filed: Jun. 29, 1989

Certificate of Correction issued Mar. 2, 1993.

Certificate of Correction issued Apr. 6, 1993.

(51) Int. Cl.
*H04B 15/00* (2006.01)

(52) U.S. Cl. .................. 375/141; 370/338; 370/349; 375/E1.002

(58) Field of Classification Search .............. 370/348, 370/445, 329, 331, 441, 311, 448; 455/343.3, 455/450; 375/141, 147; 340/825.72
See application file for complete search history.

(56) References Cited

U.S. PATENT DOCUMENTS

| | | | |
|---|---|---|---|
| 3,251,034 A | 5/1966 | Goode et al. | |
| 3,959,589 A | 5/1976 | von Roesgen et al. | |
| 4,022,973 A | 5/1977 | Stackhouse et al. | |
| 4,197,500 A | 4/1980 | Klein et al. | |
| 4,291,410 A | 9/1981 | Caples et al. | |
| 4,332,027 A * | 5/1982 | Malcolm et al. | 370/448 |
| 4,344,171 A | 8/1982 | Lin et al. | |
| 4,418,277 A | 11/1983 | Tremmel et al. | |
| 4,449,248 A | 5/1984 | Leslie et al. | |
| 4,460,120 A | 7/1984 | Shepard et al. | |
| 4,477,809 A | 10/1984 | Bose | |
| 4,479,261 A * | 10/1984 | Oda et al. | 455/343.3 |
| 4,587,661 A * | 5/1986 | Schiff | 375/141 |
| 4,612,637 A * | 9/1986 | Davis et al. | 370/348 |
| 4,654,654 A | 3/1987 | Butler et al. | |
| 4,661,902 A | 4/1987 | Hochsprung et al. | |
| 4,673,805 A | 6/1987 | Shepard et al. | |

(Continued)

FOREIGN PATENT DOCUMENTS

| | | |
|---|---|---|
| DE | 3304451 | 10/1984 |
| EP | 0075310 | 3/1983 |
| EP | 0 131 662 | 1/1985 |
| EP | 0 131 663 | 1/1985 |
| EP | 0 303 020 | 2/1989 |
| EP | 0 314 217 | 5/1989 |
| EP | 0 319 219 | 6/1989 |
| JP | 53-108310 | 9/1978 |
| JP | 55-136733 | 10/1980 |
| JP | 61-071738 | 4/1986 |
| JP | 61-270930 | 12/1986 |
| JP | 63-98438 | 8/1988 |
| WO | WO 88/04496 | 6/1988 |

OTHER PUBLICATIONS

"Digital Terminal for Packet Broadcasting", AFIPS Conference Proceedings, 1975 National Computer Conference, May 19–22, 1975, pp. 254–261.

(Continued)

*Primary Examiner*—Roland G. Foster

(57) ABSTRACT

A packet data transmission system is used to link a number of remote hand-held data-gathering units such as bar code readers to a central computer which maintains a database management system. Data packets are sent from the remote units by an RF link to intermediate base stations, then sent by the base stations to the central computer by a serial link. Direct sequence spread spectrum modulation is used for the RF link. The remote hand-held units initiate an exhange using RF transmission to and from the base stations, receiving only during a rigid time window following a transmission from the remote unit. The base stations cannot initiate communication to the remote units, but instead send data to the remote units only as part of the exchange.

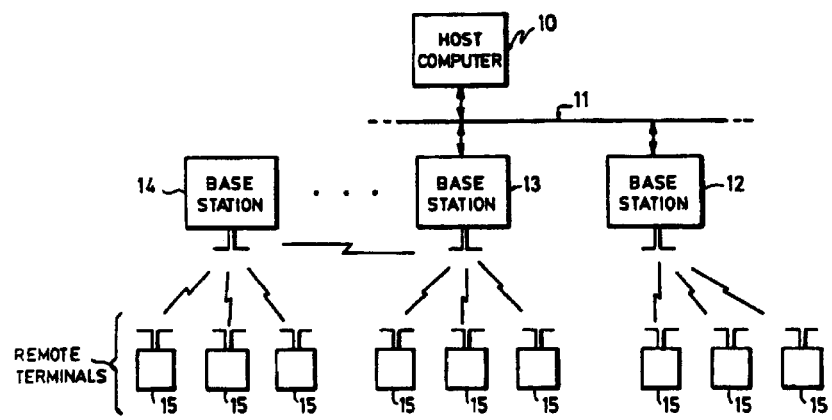

U.S. PATENT DOCUMENTS

| | | | |
|---|---|---|---|
| 4,679,244 A | | 7/1987 | Kawasaki et al. |
| 4,704,517 A | | 11/1987 | Campisi et al. |
| 4,720,710 A | | 1/1988 | Akahori et al. |
| 4,736,095 A | | 4/1988 | Shepard et al. |
| 4,758,717 A | | 7/1988 | Shepard et al. |
| 4,771,448 A | * | 9/1988 | Koohgoli et al. ............ 455/450 |
| 4,777,488 A | * | 10/1988 | Carlman et al. ........ 340/825.72 |
| 4,792,947 A | | 12/1988 | Takiyasu et al. |
| 4,807,222 A | | 2/1989 | Amitay |
| 4,807,261 A | | 2/1989 | Johnson |
| 4,811,379 A | | 3/1989 | Grandfield |
| 4,857,716 A | | 8/1989 | Gombrich et al. |
| 4,882,770 A | | 11/1989 | Miyahira et al. |
| 4,910,794 A | | 3/1990 | Mahany |
| 4,928,096 A | | 5/1990 | Leonardo et al. |
| 4,933,953 A | | 6/1990 | Yagi |
| 4,940,963 A | | 7/1990 | Gutman et al. |
| 4,979,168 A | | 12/1990 | Courtois et al. |
| 4,995,053 A | | 2/1991 | Simpson et al. |
| 5,006,996 A | | 4/1991 | Nakamura et al. |
| 5,010,241 A | | 4/1991 | Butterworth |
| 5,020,093 A | | 5/1991 | Pireh |
| 5,046,066 A | | 9/1991 | Messenger |

OTHER PUBLICATIONS

Lin, Shu and Costello, Daniel J., Jr., "Error Control Coding: Fundamentals and Applications," Prentice–Hall, Inc., Englewoods Cliffs, NJ, 1983, pp. 458–465.

Michael J. Ferguson, "On the Control, Stability, and Waiting Time in a Slotted Aloha Random–Access System", IEEE Transactions on Communication, Nov. 1975, pp. 1300, 1308 and 1310.

Certified Translation of a German Patent No. DE 3304451, 21 pages (Oct. 18, 1984—Date of Publication of Patent).

English Language Abstract of Japanese Patent Publication No. JP 53–103810, data supplied by espacenet, 1 page (Sep. 21, 1978—Date of Publication).

English Language Abstract of Japanese Patent Publication No. JP 55–136733, data supplied by espacenet, 1 page (Oct. 24, 1980—Date of Publication).

English Language Abstract of Japanese Patent Publication No. JP 61–071738, data supplied by espacenet, 1 page (Apr. 12, 1986—Date of Publication).

English Language Abstract of Japanese Patent Publication No. JP 61–270930, data supplied by espacenet, 1 page (Dec. 1, 1986—Date of Publication).

English Language Abstract of Japanese Patent Publication No. JP 63–198438, data supplied by espacenet, 1 page (Aug. 17, 1988—Date of Publication).

Leonard Kleinrock, et al., "Packet Switching in Radio Channels: Part I—Carrier Sense Multiple–Access Modes and Their Throughput–Delay Characteristics", IEEE Transactions on Communications, vol. Com–23, No. 12, Dec. 1975, pp. 1400–1416.

B.S. Tsybakov, et al., "Packet Transmission in Radio Networks", Reprinted with permission from Problemy Peredacti Informaisii, vol. 21, No. 1, pp. 80–101, Jan.–Mar. 1985, pp. 330–341.

Norman Abramson, "The Throughput of Packet Broadcasting Channels", IEEE Transactions on Communication, Jan. 1977, pp. 117–128.

J.M. Wozencraft, et al., "Coding for Two–Way Channels", Research Laboratory of Electronics and Lincoln Laboratory, Massachusetts Institute of Technology, pp. 11–25.

Simon S. Lam, et al., "Packet Switching in a Multiaccess Broadcast Channel: Dynamic Control Procedures", Transactions on Communications, vol. Com – 23, No. 9, Sep. 1975, pp. 891–904.

J.J. Spilker, Jr. Ph.D., "Digital Communications by Satellite", 1977, pp. 449–450, 452–453 and 468.

John M. Wozencraft, et al., "Coding For Two–Way Channels", Technical Report 383, Jan. 3, 1961, pp. 1–16.

Lawrence G. Roberts, "Extensions of Packet Communication Technology to a Hand Held Personal Terminal", Spring Joint Computer Conference, 1972, pp. 295–298.

Mario Tokoro, et al., "Acknowledging Ethernet", pp. 1–6.

Robert E. Kahn, et al., "Advances in Packet Radio Technology", Proceeding of the IEEE, vol. 66, No. 11, pp. 1468–1496.

R. Binder, et al., "Aloha Packet Broadcasting—A Retrospect", AFIPS Conference Proceedings, 1975 National Computer Conference, May 19–22, 1975, pp. 203–215.

Norman Abramson, "The Aloha System—Another Alternative for Computer Communications", AFIPS Conference Proceedings, vol. 37, 1970 Fall Joint Computer Conference, Nov. 17–19, pp. 281–285.

Richard Binder, et al., "The Alohanet Menehune—Version 11", Sponsored by Advanced Research Projects Agency, ARPA Order No. 1956, Sep. 1974, pp. 1–55.

Andrew S. Tanenbaum "Computer Networks" $2^{nd}$ Ed., Ch. 3, 1988, pp. 182–193.

MSI PRT Portable Radio Terminal, 2 pages.

Norman Abramson, "Packet Switching with Satellites", AFIPS Conference Proceedings, 1973 National Computer Conference and Exposition, vol. 42, Jun. 4–8, 1973, pp. 695–702.

Leonard Kleinrock, et al., "Random Access Techniques for Data Transmission Over Packet–Switched Radio Channels", AFIPS Conference Proceedings, 1975 National Computer Conference, May 19–22, 1975, pp. 187–201.

The Vectran VR1100 System: Your Link to Productivity, 11 pages.

Memorandum Order, *Symbol Technologies, Inc.* v. *Proxim Incorporated*, CA No. 01–801–SLR, Jul. 30, 2003, pp. 1–7.

Trial Transcript, vol. E, *Symbol Technologies, Inc.* v. *Proxim Incorporated*, C.A. No. 01–801–SLR, Sep. 12, 2003, pp. 1055, 1056, 1092, 1208.

English Abstract of EP0075310A: Circuit Arrangement for Telecommunication Exchanges, Especially Telephone Exchanges, with Devices for Securing the Transmission of Coded Signals.

J.S.J. Daka, et al., "A High Performance Broadcast File Transfer Protocol", SIGCOMM '88 Symposium, Communication Architectures & Protocols, 1988, pp. 274–281.

S. Chow, et al., "A Spread Spectrum Modem for Reliable Data Transmission in the High Frequency Band", Second Conference on HF Communication Systems and Techniques, Feb. 15–17, 1982, pp. 125–130.

Fralick et al. "Digital Terminals for Packet Broadcasting" AFIPS National Computer Conferenace (NCC) Proceedings vol. 44 (May 19–22, 1975), pp. 253–262.

Kleinrock et al. "Packet Switching in Radio Channels: Part I—Carrier Sense Multiple–Access Modes and Their Throughput–Delay Characteristics," IEEE Transactions on Communications, vol. 23, No. 12, Dec. 1975, pp. 1400–1416.

* cited by examiner

US 5,029,183 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 70–84 is confirmed.

Claims 1, 21, 40, 50 and 60 are determined to be patentable as amended.

Claims 2–20, 22–39, 41–49, 51–59 and 61–69, dependent on an amended claim, are determined to be patentable.

New claims 85–89 are added and determined to be patentable.

1. A method of transmitting data packets from one of a plurality of remote terminal units *in a power save mode of operation* to a base station, comprising the steps of:
   (a) transmitting a data packet from said one unit to said base station during a first time period selected by the unit;
   (b) receiving at said one unit from said base station an acknowledge signal during a second time period occurring only a fixed time delay after said first time period, said second time period being the same for at least some of said units,
   *wherein steps (a) and (b) are performed during said power save mode of operation in which said base station cannot initiate data communications with said one of said plurality of remote terminal units.*

21. A system for transmitting data packets from one of a plurality of first stations to a second station *wherein said plurality of first stations have a power save mode of operation in which said second station cannot initiate data communications with said plurality of first stations*, comprising:
   (a) a transmitter in said one first station for transmitting a data packet from said one first station to the second station during a first time period selected by said one first station;
   (b) a receiver in said one first station for receiving an acknowledge signal from the second station during a second time period occurring only in a time window referenced to said first time period by a fixed delay, said fixed delay being the same for all said plurality of first stations,
   *wherein said transmitting and receiving are performed during said power save mode of operation.*

40. A method of data transmission between a plurality of terminals *in a power save mode of operation* and a base station, comprising the steps of:
   (a) transmitting a data packet from one of said terminals to said base station at a time selected by said one of said terminals, the data packet including identification of said one of the terminals; transmitting an acknowledgement from the base station to said one of said terminals in a predetermined time window, at least part of said predetermined time window being the same for all of said terminals, said acknowledgement including identification of said terminal; *and*
   [(c)] (*b*) receiving said acknowledgement at said one terminal during said predetermined time window,
   *wherein steps (a) and (b) are performed during said power save mode of operation in which said base station cannot initiate data communications with said one of said plurality of remote terminal units.*

50. A data communication system comprising:
   (a) a host computer including a data communication input/output port;
   (b) a plurality of base stations; each base station having a data communication input/output port; said data communication input/output ports of the host computer and at least one of said base stations being connected by a data communications link; each of the base stations having an RF transmitter/receiver responsive to received encoded RF signal packets and transmitting RF acknowledge signal packets; each of the base stations producing digital data corresponding to said received encoded RF signal packets, and storing said digital data for transferring to said host computer via said data communication input/output port and said data communications link;
   (c) a plurality of remote units *having a power save mode of operation*, each remote unit located for sending said encoded RF signal packets to one of said base stations at a time selected by the remote unit and receiving said RF acknowledge signal packets from one of said base stations in a fixed time window *during said power save mode of operation*, each of the remote units having:
      (i) a memory for storing data from a local data source, and a processor for transferring data to and from the memory;
      (ii) an RF transmitter/receiver having a modulator for modulating an outgoing carrier with data from said memory to produce said encoded RF signal packets, and a detector responsive to RF signals received by said RF transmitter/receiver to detect RF acknowledge signal packets from the base station in said fixed time window,
   *wherein said plurality of base stations cannot initiate data communications with said plurality of remote terminal units during said power save mode of operation.*

60. A data communication system comprising:
   (a) at least one base station; each base station having an RF transmitter/receiver responsive to encoded RF signal packets and producing RF acknowledge packets; each base station decoding said encoded RF signal packets received by said RF transmitter/receiver and producing digital data corresponding thereto;
   (b) a plurality of remote units *having a power save mode of operation*, each located for sending said encoded RF signal packets to at least one of said base stations and receiving said RF acknowledge packets from one of said base stations *during said power save mode of operation*, each of the remote units having:
      (i) a data source, a memory for storing data from the data source, and a processor for transferring data to and from the memory;
      (ii) an RF transmitter/receiver producing said encoded RF signal packets containing data from said memory and detecting said RF acknowledge packets from a base station to load data from detected packets to said memory, wherein said RF transmitter/receiver in said remote unit is activated for detecting an RF acknowledge packet only during a fixed time window following transmission of an encoded RF signal packet, wherein said plurality of base stations cannot initiate data communications with said plurality of remote terminal units during said power save mode of operation.

85. A method of data transmission between a plurality of terminals and a base station, comprising the steps of:

forming a data packet in a memory by expanding a multi-byte packet to create an expanded packet then producing in said memory an exclusive-OR of said expanded packet and a fixed pseudorandom sequence of bits;

transmitting said data packet from one of said terminals to said base station at a time selected by said one of said terminals, the data packet including identification of said one of the terminals; transmitting an acknowledgement from the base station to said one of said terminals in a predetermined time window, at least part of said predetermined time window being the same for all of said terminals, said acknowledgement including identification of said terminal; and receiving said acknowledgement at said one terminal during said predetermined time window, wherein said transmitting is by wireless RF, wherein said RF is modulated by the spread spectrum technique, and wherein said spread spectrum technique employs a sequence of frequency shifts between two frequencies.

86. A method according to claim 85 wherein said multi-byte packet includes the results of reading a bar code symbol.

87. A data communication system comprising:

(a) a host computer including a data communication input/output port;

(b) a plurality of base stations; each base station having a data communication input/output port; said data communication input/output ports of the host computer and at least one of said base stations being connected by a data communications link; each of the base stations having an RF transmitter/receiver responsive to received encoded RF signal packets and transmitting RF acknowledge signal packets; each of the base stations producing digital data corresponding to said received encoded RF signal packets, and storing said digital data for transferring to said host computer via said data communication input/output port and said data communications link;

(c) a plurality of remote units, each remote unit located for sending said encoded RF signal packets to one of said base stations at a time selected by the remote unit and receiving said RF acknowledge signal packets from one of said base stations in a fixed time window, each of the remote units having:

(i) a memory for storing data from a local data source, and a processor for transferring data to and from the memory;

(ii) an RF transmitter/receiver having a modulator for modulating an outgoing carrier with data from said memory to produce said encoded RF signal packets, and a detector responsive to RF signals received by said RF transmitter/receiver to detect RF acknowledge signal packets from the base station in said fixed time window, wherein each one of said remote units is identified by a unique identifying code contained in said encoded RF signals transmitted by the remote unit, and wherein said base stations are responsive to said unique identifying code to allow only one of the base stations to send said RF acknowledge signals to each separate remote unit, wherein each one of said base stations in responsive to all of the encoded RF signals from all of the remote units within range, and detects the number of errors occurring in reception from each one of the remote units in said encoded RF signals, and wherein a representation of said number of errors is transmitted to other of said base stations via said communication link to specify the unique codes of remote units each base station is to be responsive to by sending said RF acknowledge signals, said information being derived from said respresentation of number of errors.

88. A system according to claim 87 wherein at least some of said remote units are hand-held bar code readers.

89. A data communication system comprising:

(a) at least one base station; each base station having an RF transmitter/receiver responsive to encoded RF signal packets and producing RF acknowledge packets; each base station decoding said encoded RF signal packets received by said RF transmitter/receiver and producing digital data corresponding thereto;

(b) a plurality of remote units each located for sending said encoded RF signal packets to at least one of said base stations and receiving said RF acknowledge packets from one of said base stations, each of the remote units having:

(i) a data source, a memory for storing data from the source, and a processor for transferring data to and from the memory;

(ii) an RF transmitter/receiver producing said encoded RF signal packets containing data from said memory and detecting said RF acknowledge packets from a base station to load data from detected packets to said memory, wherein said RF transmitter/receiver in said remote unit is activated for detecting an RF acknowledge packet only during a fixed time window following transmission of an encoded RF signal packet, wherein said RF transmitter/receiver in said remote unit is activated by said processor for detecting said RF acknowledge packet only during a fixed time window following transmission of said encoded RF signal packet, wherein said RF transmitter/receiver in a remote unit sends said RF signal packet only after receiving to detect any other RF signal from another remote unit which may be present, wherein said base station decodes said RF signal packet while said RF signal packet is being received, and said remote unit decodes said RF acknowledge signal after said RF acknowledge signal has been received by accessing said memory via said processor, and wherein said base station decodes said RF signal packet by loading detected data corresponding to the signal serially into a register and decoding bits of said register in parallel.

* * * * *